US009490611B2

(12) United States Patent
Westrick, Jr. et al.

(10) Patent No.: US 9,490,611 B2
(45) Date of Patent: Nov. 8, 2016

(54) UNIVERSAL LOAD CONTROL CABINET

(71) Applicant: ABL IP Holding, LLC, Conyers, GA (US)

(72) Inventors: Richard L. Westrick, Jr., Social Circle, GA (US); Dalibor Zulim, Conyers, GA (US)

(73) Assignee: ABL IP Holding LLC, Decatur, GA (US)

( * ) Notice: Subject to any disclaimer, the term of this patent is extended or adjusted under 35 U.S.C. 154(b) by 132 days.

(21) Appl. No.: 14/256,244

(22) Filed: Apr. 18, 2014

(65) Prior Publication Data
US 2014/0313643 A1 Oct. 23, 2014

Related U.S. Application Data

(60) Provisional application No. 61/813,456, filed on Apr. 18, 2013.

(51) Int. Cl.
*H02H 9/02* (2006.01)
*H02B 1/32* (2006.01)
*H05B 33/08* (2006.01)
(Continued)

(52) U.S. Cl.
CPC .................. *H02B 1/32* (2013.01); *H02H 3/00* (2013.01); *H02M 3/158* (2013.01); *H02M 5/293* (2013.01); *H05B 33/0815* (2013.01); *H05B 33/0818* (2013.01); *G09G 3/3406* (2013.01); *H02M 3/156* (2013.01); *H02M 2001/327* (2013.01);
(Continued)

(58) Field of Classification Search
CPC ...... H05B 37/00; H05B 37/02; H05B 41/36; H05B 41/40; H02H 3/00; H02H 3/347; H02H 9/08
USPC ........... 315/292–295, 316, 317, 324; 361/42, 361/45, 49, 50
See application file for complete search history.

(56) References Cited

U.S. PATENT DOCUMENTS 3,943,397 A * 3/1976 Yancey ................ H05B 37/029
315/317
4,977,484 A 12/1990 Cunningham et al.
(Continued)

FOREIGN PATENT DOCUMENTS

CA 2849531 10/2014
CA 2849533 10/2014
(Continued)

OTHER PUBLICATIONS

Office Action for Canadian Application No. CA 2,849,536, mailed Jul. 14, 2015, 3 pages.
(Continued)

*Primary Examiner* — Tung X Le
(74) *Attorney, Agent, or Firm* — Kilpatrick Townsend & Stockton, LLP

(57) ABSTRACT

A universal load control module may include a power supply that operates over a wide voltage range, a microcontroller, and one or more functional control blocks. A functional control block may include a dimmer circuit for controlling a lighting load that provides reverse phase cut mode dimming, forward phase cut mode dimming, and hybrid phase cut mode dimming, as well as thermal protection. One or more universal control modules may be housed in a cabinet that include a cabinet control module. The cabinet may include additional thermal protection measures.

20 Claims, 19 Drawing Sheets

(51) Int. Cl.
*H02H 3/00* (2006.01)
*H02M 5/293* (2006.01)
*H02M 3/158* (2006.01)
H02M 3/156 (2006.01)
G09G 3/34 (2006.01)
H05B 41/282 (2006.01)
H05B 37/02 (2006.01)
H02M 1/32 (2007.01)

(52) U.S. Cl.
CPC ...... *H02M2005/2935* (2013.01); *H05B 37/02* (2013.01); *H05B 41/2828* (2013.01); *Y10S 315/07* (2013.01)

(56) References Cited

U.S. PATENT DOCUMENTS

| | | | |
|---|---|---|---|
| 5,334,914 | A | 8/1994 | Dean et al. |
| 5,600,233 | A | 2/1997 | Warren et al. |
| 5,962,988 | A | 10/1999 | Nuckolls et al. |
| 6,400,098 | B1 | 6/2002 | Pun |
| 6,727,665 | B2 | 4/2004 | Yao |
| 6,969,959 | B2 | 11/2005 | Black et al. |
| 7,071,634 | B2 | 7/2006 | Johnson et al. |
| 7,075,251 | B2 | 7/2006 | Chen et al. |
| 7,166,970 | B2 | 1/2007 | Johnson et al. |
| 7,190,125 | B2 | 3/2007 | McDonough et al. |
| 7,265,503 | B2 | 9/2007 | Green |
| 7,339,331 | B2 | 3/2008 | Vanderzon |
| 7,342,764 | B2 | 3/2008 | Black |
| 7,489,088 | B2 | 2/2009 | Frid |
| 7,619,365 | B2 | 11/2009 | Davis et al. |
| 7,843,149 | B2 | 11/2010 | Lai |
| 8,076,862 | B2 | 12/2011 | Thirugnanasambandham |
| 8,130,494 | B2 | 3/2012 | Larsen et al. |
| 8,212,491 | B2 | 7/2012 | Kost et al. |
| 8,247,990 | B1 * | 8/2012 | Gordin ................ H05B 41/40 315/144 |
| 8,283,875 | B2 | 10/2012 | Grotkowski et al. |
| 8,446,700 | B2 | 5/2013 | Vanderzon |
| 8,526,181 | B2 | 9/2013 | Levesque et al. |
| 8,581,518 | B2 | 11/2013 | Kuang et al. |
| 8,610,365 | B2 | 12/2013 | King et al. |
| 8,878,455 | B2 | 11/2014 | Hatley et al. |
| 2002/0101184 | A1 | 8/2002 | Chansky et al. |
| 2003/0234619 | A1 | 12/2003 | Brunker et al. |
| 2008/0112098 | A1 * | 5/2008 | Stone .................... H02H 9/044 361/42 |
| 2008/0258650 | A1 | 10/2008 | Steiner et al. |
| 2009/0134818 | A1 | 5/2009 | Biggs et al. |
| 2009/0244830 | A1 | 10/2009 | Wyatt et al. |
| 2010/0019889 | A1 | 1/2010 | Braunshtein |
| 2010/0023177 | A1 | 1/2010 | Tsai et al. |
| 2010/0246122 | A1 | 9/2010 | Larsen et al. |
| 2010/0283391 | A1 | 11/2010 | Braunshtein |
| 2010/0327778 | A1 | 12/2010 | Schanin et al. |
| 2011/0121744 | A1 | 5/2011 | Salvestrini et al. |
| 2012/0056553 | A1 | 3/2012 | Koolen et al. |
| 2012/0133294 | A1 | 5/2012 | Sutton |
| 2012/0299500 | A1 | 11/2012 | Sadwick et al. |
| 2012/0306401 | A1 | 12/2012 | Wei et al. |
| 2013/0162167 | A1 | 6/2013 | Gallo |
| 2013/0169186 | A1 | 7/2013 | Steiner et al. |
| 2013/0170263 | A1 | 7/2013 | Newman, Jr. et al. |
| 2013/0175931 | A1 | 7/2013 | Sadwick |
| 2013/0176755 | A1 | 7/2013 | Armstrong et al. |
| 2013/0181635 | A1 | 7/2013 | Ling |
| 2013/0187623 | A1 | 7/2013 | Harel |
| 2013/0257406 | A1 | 10/2013 | Hausman, Jr. et al. |
| 2013/0293137 | A1 | 11/2013 | Jennings et al. |
| 2013/0312773 | A1 | 11/2013 | Molle et al. |
| 2013/0313995 | A1 | 11/2013 | Sadwick |
| 2014/0028209 | A1 | 1/2014 | Kitamura et al. |
| 2014/0043714 | A1 * | 2/2014 | Benke .................. H02H 1/0023 361/42 |
| 2014/0312773 | A1 | 10/2014 | Zulim et al. |
| 2014/0312798 | A1 | 10/2014 | Westrick, Jr. et al. |
| 2014/0312869 | A1 | 10/2014 | Zulim et al. |
| 2014/0361701 | A1 | 12/2014 | Siessegger et al. |
| 2015/0102101 | A1 | 4/2015 | Hazzard |

FOREIGN PATENT DOCUMENTS

| | | |
|---|---|---|
| CA | 2849536 | 10/2014 |
| JP | 2008253120 | 10/2008 |

OTHER PUBLICATIONS

Non-Final Office Action for U.S. Appl. No. 14/256,221, mailed Sep. 24, 2015, 20 pages.
Office Action for Canadian Application No. CA 2,849,539, mailed Sep. 29, 2015, 6 pages.
Non-Final Office Action for U.S. Appl. No. 14/256,302, Jun. 2, 2015, 12 pages.
Office Action for Canadian Application No. CA 2,849,531, mailed Jul. 14, 2015, 3 pages.
Office Action for Canadian Application No. CA 2,849,533, mailed Aug. 6, 2015, 4 pages.
Final Office Action for U.S. Appl. No. 14/256,221, mailed Apr. 20, 2016, 22 pages.
Notice of Allowance for U.S. Appl. No. 14/256,272, mailed Apr. 12, 2016, 7 pages.
Notice of Allowance for Canadian Patent Application No. CA 2,849,533, mailed Apr. 5, 2016, 1 page.
Ex Parte Quayle Action for U.S. Appl. No. 14/256,272, mailed Feb. 11, 2016, 8 pages.
Office Action for Canadian Application No. 2,849,536, mailed Nov. 4, 2015 (3 Pages).
Office Action for Canadian Application No. 2,849,531, mailed Nov. 23, 2015 (3 Pages).
Final Office Action for U.S. Appl. No. 14/256,302, mailed Mar. 17, 2016, 16 pages.
Notice of Allowance for U.S. Appl. No. 14/256,302, mailed Aug. 3, 2016, 15 pages.
Notice of Allowance for Canadian Patent Application No. CA 2,849,531, mailed Jul. 22, 2016, 1 page.
Advisory Action for U.S. Appl. No. 14/256,221, mailed Sep. 8, 2016, 3 pages.

* cited by examiner

UNIVERSAL LOAD CONTROL CABINET

RELATED APPLICATIONS

The present application claims priority to U.S. provisional application No. 61/813,456 for "Multi-Volt Dimmer Cabinet" filed Apr. 18, 2013, which is incorporated by reference herein in its entirety. The present application is related to U.S. Ser. Nos. 14/256,302, 14/256,221, and 14/256,272 now issued U.S. Pat. No. 9,401,588 filed concurrently herewith.

FIELD OF THE INVENTION

The present invention is directed to a lighting control system that provides dimming and that operates over a wide input voltage range.

BACKGROUND

Dimmer circuits and dimmer cabinet assemblies currently offered in the market are typically specific to the voltage of the power circuit since many of the main components of the dimmer circuit are designed to operate at a specific voltage or a very narrow voltage range. As a result manufacturers, distributors, and retailers need to produce and stock multiple versions of dimmer circuits and dimmer cabinet assemblies. They also need to make sure that the correct dimmer circuit or dimmer cabinet assembly is provided to their customer. It would be simpler if a single dimmer circuit or a single dimmer cabinet assembly could operate over a wider voltage range because it would minimize the number of different dimmer circuits and dimmer cabinet assemblies required and would reduce the possibility of filling an order with the incorrect product.

SUMMARY

The present invention is directed to a lighting control system and its components configured to operate across a wide range of input voltages or across multiple ranges of input voltages.

One aspect of the invention is directed to a dimmer circuit that provides reverse phase cut mode dimming, forward phase cut mode dimming, and hybrid phase cut mode dimming. The dimmer circuit may include transition time control, over current protection, and inductive load sensing. Thermal protection for the module may be provided through a combination of physical components and firmware.

Another aspect of the invention is a universal load control module. The universal load control module may combine functional control blocks, such as a dimmer circuit, a control interface and/or a communications interface, along with a microcontroller and a power supply that can operate across a wide voltage range.

In yet another aspect of the invention, a cabinet houses multiple universal load control modules. The cabinet may include a cabinet control module, which configures and controls the modules, as well as provides an external interface. The cabinet may also include features to assist with thermal protection, such as a thermal shelf, spaced apart branch circuit breakers and an optional cooling device.

BRIEF DESCRIPTION OF THE DRAWINGS

These and other features, aspects, and advantages of the present disclosure are better understood when the following Detailed Description is read with reference to the accompanying drawings, where.

DETAILED DESCRIPTION

The present invention is directed to a lighting control system and its components, and in particular to a dimmer circuit, a load control module that may include the dimmer circuit, and a load control cabinet that may include the module. The system and its components are configured to operate across a wide range of input voltages or across multiple ranges of input voltages. The system may provide multiple dimmers and include thermal protection. A load control module may include one or more dimmers and/or a control or communication interface. A cabinet assembly may include multiple load control modules controlled by a cabinet control module. Alternatively, a single load control module may be configured to operate in a stand-alone mode.

The system and/or its components may be referred to as "universal" or "multi-volt" since they can operate over a wide range of input voltages or over multiple ranges of input voltages. Typically, the system does not require user intervention to configure the system or its components to any particular input voltage. Instead, the components of the system automatically adjust to the input voltage. In an exemplary lighting control system, the input voltage may be 120/230/277Vac, 50/60 Hz. Other systems may operate with different input voltages, including voltages up to at least 347Vac.

One aspect of the invention is a dimmer circuit. The dimmer circuit may include circuitry to support reverse phase cut mode dimming, forward phase cut mode dimming, and hybrid phase cut mode dimming. The dimmer module may also include ON/OFF and slew rate control, wave shaping, transition time control, over current protection, and inductive load sensing. Thermal protection for the module may be provided through a combination of physical components and firmware.

Another aspect of the invention is a universal load control module. The universal load control module may combine functional control blocks, such as a dimmer, 0-10V control, a DALI interface, etc. in a single module. The universal load control module may operate independently or may be controlled with other universal load control modules by a cabinet control module.

In yet another aspect of the invention, a cabinet houses multiple universal load control modules. The cabinet may include a cabinet control module, which configures and controls the modules, as well as provides an external interface.

Universal Phase Dimming Module

Figure 1:
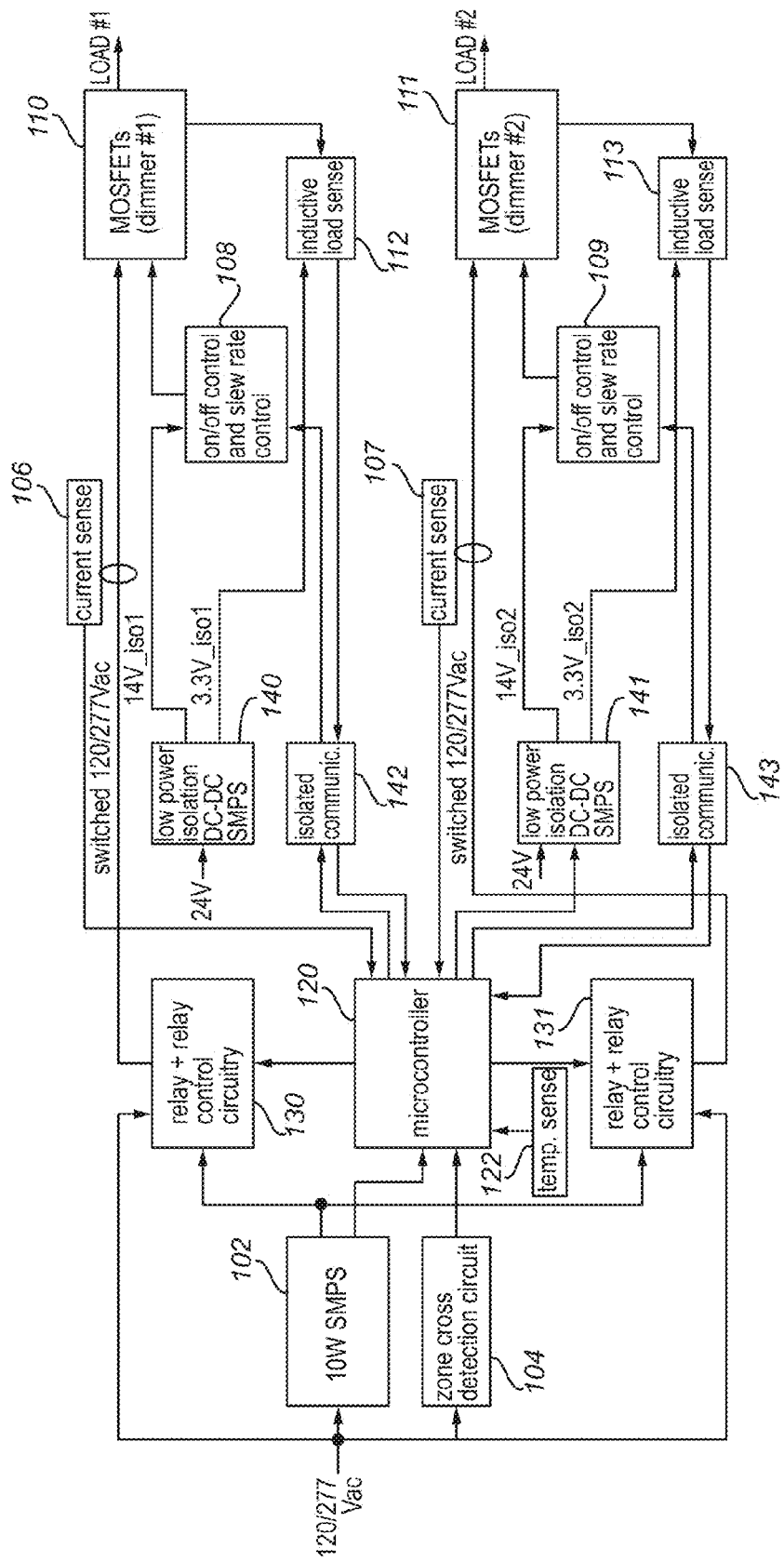
FIG. 1 is a block diagram of an exemplary universal phase dimming module.

FIG. 1 is a block diagram illustrating an exemplary universal phase dimming module that operates over multiple voltage ranges. The universal phase dimming module includes a power supply 102, a zero cross detection circuit 104, a microcontroller 120, optional relay and relay control circuitry 130, 131, power switching devices 110, 111, ON/OFF and slew rate control circuitry 108, 109, inductive load sense circuitry 112, 113, current sense circuitry 106, 107, and temperature sense circuitry 122. Although FIG. 1 illustrates an embodiment that supports two dimmers (dimmer #1, dimmer #2) connected to two loads (LOAD #1, LOAD #2), other embodiments may support a different number of dimmers and loads. The dimmer circuit may be configured for forward phase cut (FPC), reverse phase cut (RPC) and hybrid phase cut (HPC) operating modes.

A relay and relay control circuitry 130, 131 may be used in a dimming system that uses a three-wire ballast. An electro-mechanical relay may be placed in series with the dimmer output to provide air gap isolation when the dimmer is in the OFF state. In this implementation, the inputs to the three-wire ballast include the output of the relay, the phase control signal output by the dimmer, and neutral. In other applications, the relay and relay control circuitry may not be needed.

FIG. 1 illustrates a signal from the microcontroller to the low power isolation DC-DC switched mode power supply 141. This signal may be an enable signal or it may be a PWM (pulse width modulation) control signal output by the microprocessor. The signal controls the low power isolation DC-DC switched mode power supply 141 so that it powers down the dimmer circuitry when the dimmer is OFF. A similar signal may be provided to the low power isolation block 140 (not shown). In applications that are not efficiency sensitive in the OFF state, the signal from the microcontroller may not be needed.

The microcontroller 120 outputs the PWM control signal to the isolated communication block 142, 143. The isolated communication block includes an isolated coupler, such as an optocoupler, digital isolator, or a magnetic coupler. The microcontroller varies the duty cycle of the PWM control signal to control the phase control signal output by the dimmer.

The microcontroller may include computer-readable memory or it may access external computer-readable memory that includes computer-executable instructions for lighting control, including dimming. The instructions may be related to lighting control, such as dimmer curves, rooms and zones, time scheduling, or may be related to thermal control. The microcontroller may also receive one or more inputs that direct the microcontroller to control the dimmer based on the received input. The inputs may come directly from a user or through an intervening interface, such as that provided by a cabinet control module.

Power Supply

Figure 2:
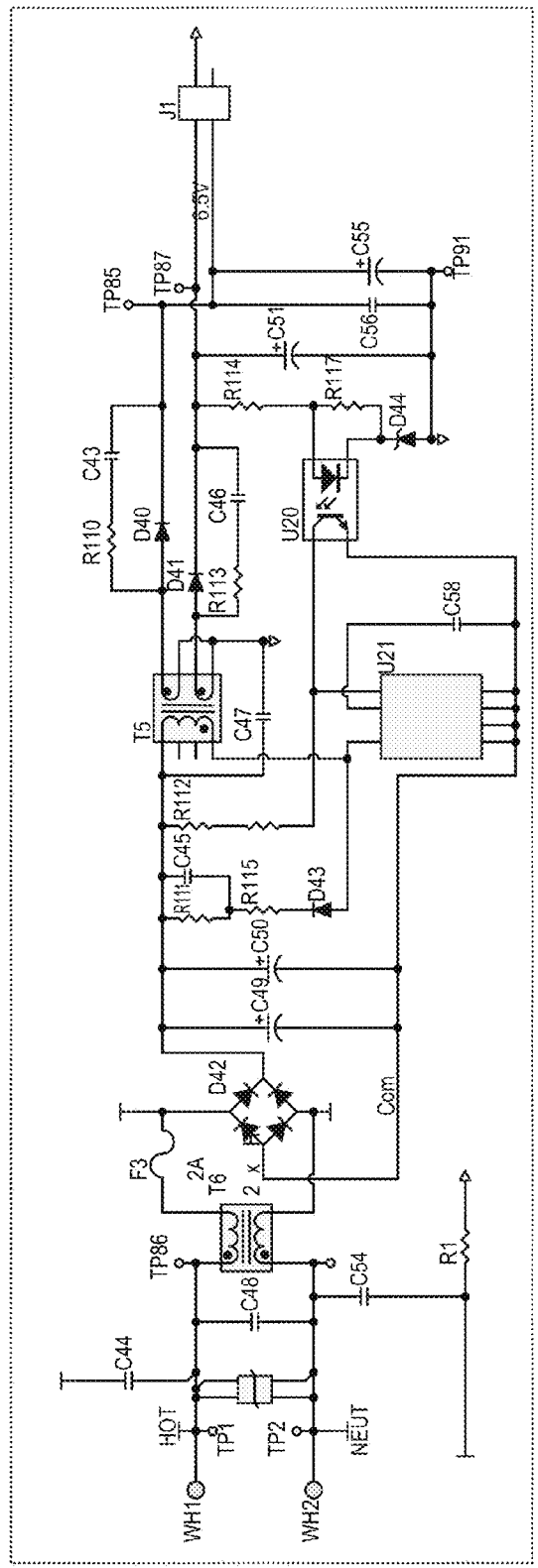
FIG. 2 is a block diagram of an exemplary universal power supply.

The dimmer circuit includes a switched mode power supply (SMPS) which is compatible with a wide input voltage range, e.g., 120/277 Vac, 50/60 Hz. FIG. 2 illustrates one implementation of a power supply 102 that provides 24V and 3.3V DC outputs to the remainder of the control and dimmer circuit. The power supply automatically detects the input voltage and adjusts its operations as needed to provide a regulated output voltage without requiring user intervention. Other power supplies may be used so long as they have the ability to work across multiple voltage ranges or a wide voltage range, preferably without requiring user intervention.

Zero Cross Detection Circuit

Figure 3:
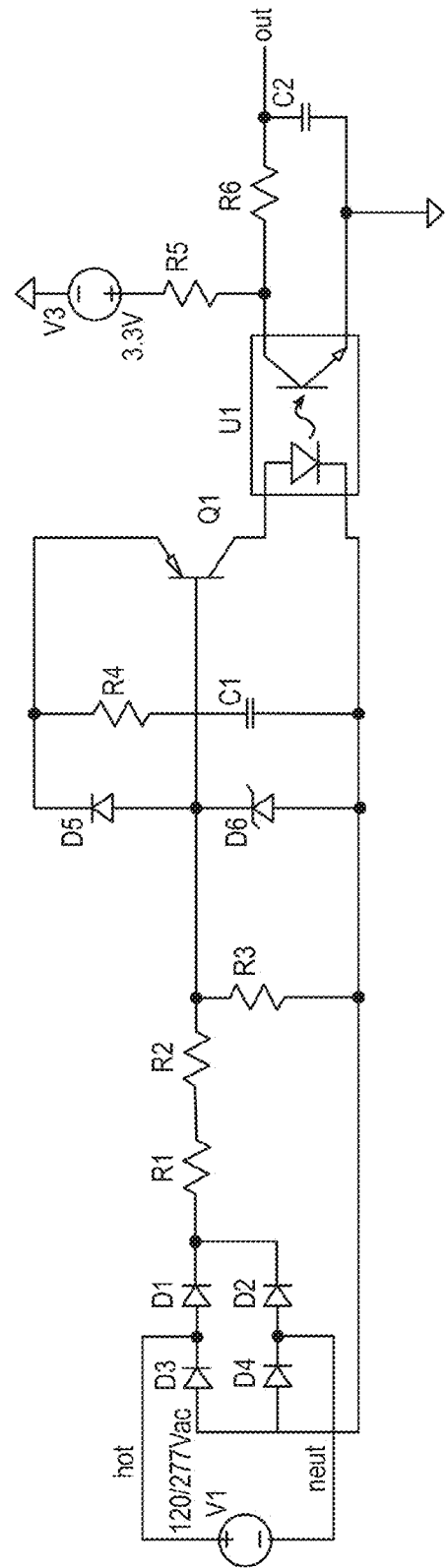
FIG. 3 is a circuit diagram of an exemplary zero cross detection circuit.

The zero cross detection circuit 104 is compatible with a wide input voltage operating range. An exemplary zero cross detection circuit is shown in FIG. 3 and utilizes high value input resistors, an efficient R-C trigger circuit, and a transistor to drive an isolating optocoupler, which provides isolation for an input to the microcontroller. The output of the zero cross detection circuit ("out" in FIG. 2) is provided to the input of the microcontroller.

The exemplary zero cross detection circuit differs from conventional designs which use simple current limiting resistors to drop the input voltage into the isolating optocoupler. Conventional designs balance power loss and heat in the resistors with the input current requirements for the optocoupler, and this balancing exercise precludes its use over a wide input voltage range, since the resistors which provide enough current at lower voltages dissipate too much power for long-term reliability at the higher voltages. Other conventional designs may include comparators, op amps, 555 timers or inexpensive microcontrollers that all require a low power universal input power supply to provide a regulated low voltage signal/power to digital and/or analog electronics.

In the exemplary zero cross detection circuit of FIG. 3, the universal input waveform is sampled with the voltage divider network (R1, R2, R3), energy is stored in capacitor (C1) and the stored energy is released through the optocoupler and current limiting resistor (R4) when the sampled signal is less than approximately 14.3 V on the base of the transistor (Q1). The output pulse on the isolated side of the optocoupler corresponds to the zero crossing of the sampled AC input voltage. This simplified comparator functionality doesn't require a constant or regulated power supply. Therefore, the reliability and expected lifetime of the circuit is significantly improved while still providing a low cost solution. The component values illustrated in FIG. 3 are exemplary. Other values, as well as other zero cross detection circuits may be used.

Figure 4:
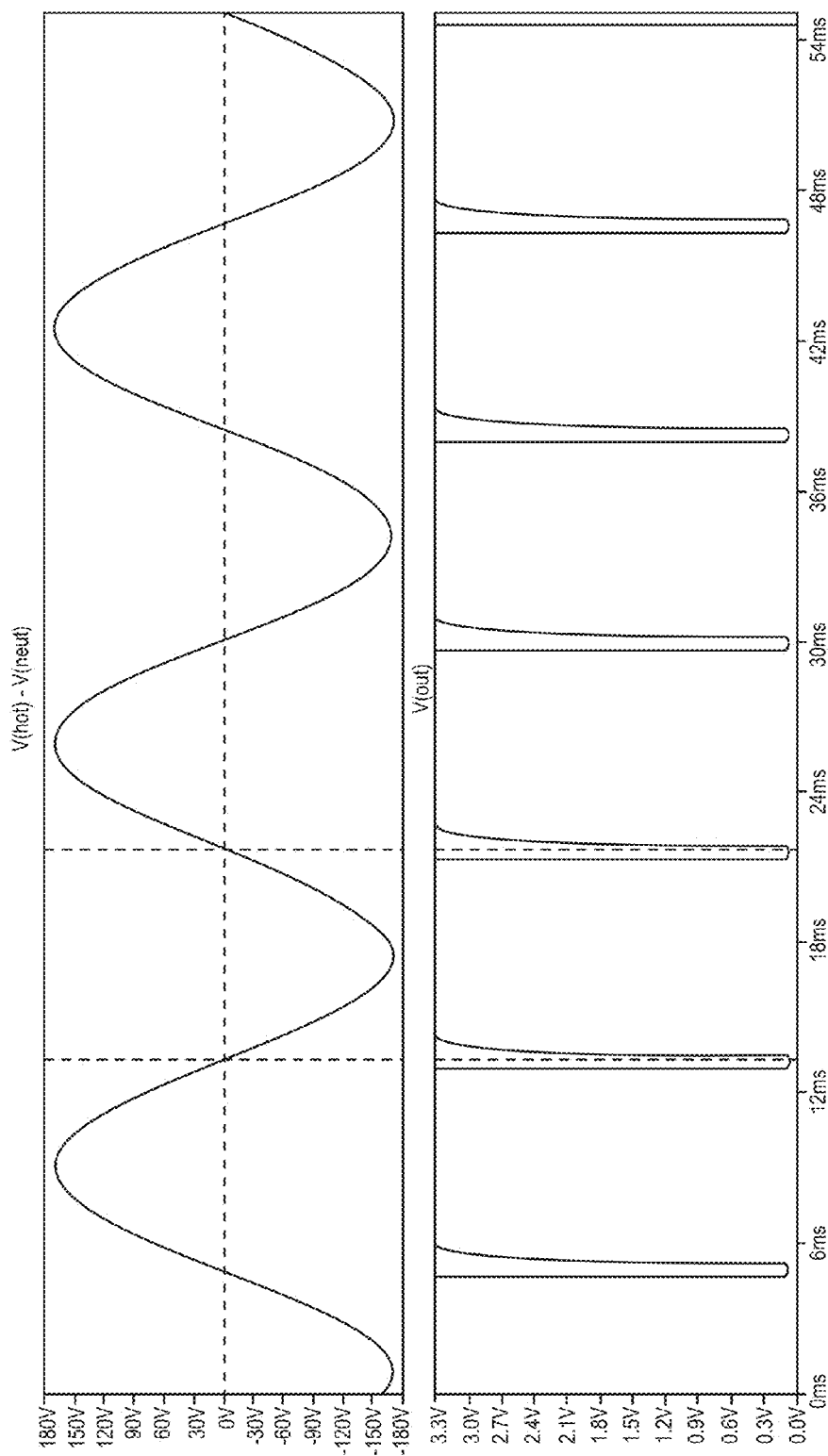
FIG. 4 illustrates an output of the exemplary zero cross detection circuit of FIG. 3.

FIG. 4 shows the output pulses corresponding to the zero cross points on the input powerline AC voltage (hot to neutral). The signals would be similar for other inputs (e.g., 120 Vac-277Vac) received on the universal input. The microcontroller uses the zero-crossing information from the zero cross detection circuit to synchronize its internal timer with the 60/50 Hz input power. This allows the microcontroller to provide a PWM control signal synchronized with the input power, which results in smooth and flicker-free dimming performance.

Although a zero cross detection circuited is needed for a phase dimmer, circuit designs other than that illustrated in FIG. 2 may be used.

Power Switching Devices

Conventional dimmers may use power switching devices, thyristors such as Silicon Controlled Rectifiers (SCRs), and/or Triacs. These devices require a "latching current" (typically greater than several milliamps) to allow the devices to continue conducting once triggered. The requirement for a latching current makes these devices inappropriate for use with modern efficient lighting loads, such as LEDs, which not only draw less current, but also may not draw it consistently enough to keep a thyristor latched.

Additionally, thyristor-based dimmer designs require series inductive filtering to reduce the EMI emitted from the dimmer, as well as the acoustic noise that the powerline switching can induce in the lamps (commonly referred to as "filament sing"). These types of filters are both load and voltage dependent, and a filter which is designed for a 277 V circuit will not have acceptable performance for smaller loads at 120 V.

The dimmer circuit uses power switching devices (110, 111 of FIG. 1; U1, U2 of FIG. 5), such as IGBTs or MOSFETs, which do not require either a minimum latching current or a series inductive filter, to allow the dimmer circuit to operate over a wide range of input voltages.

Transition Control, Including ON/OFF and Slew Rate Control

The dimmer circuit also includes circuitry to control the ON/OFF time and the slew rate. By controlling the slew rate, the dimmer circuit provides a constant fall rate di/dt for reverse phase cut dimming (See FIG. 6) and constant rise rate di/dt for forward phase cut dimming (See FIG. 7). By controlling the slew rate, the voltages across the dimmer load exhibit a similar rate of voltage change (dv/dt). Slew rate control is important for compliance with the FCC standard for radiated/emitted and conductive noise. A dimmer with slew rate control emits significantly fewer harmonics than a dimmer without slew rate control. Slew rate control also eliminates the buzzing noise associated with dimming incandescent bulbs with forward phase cut dimmers.

Conventional forward phase cut dimmers that use Triacs and SCRs require a relatively large inductor to provide series inductive filtering to control the slew rate of the dimmer. In these designs the slew rate is variable based on the load current, so the published slew rate is only applicable for specific load test conditions. In the present dimmer circuit, the slew rate is independent of the load current. The negative feedback components (C1, R7, C2, R8) provide feedback to gates of the MOSFETs (U1, U2) in order to regulate the transition time from an ON to OFF state and vice versa. The negative feedback components are not needed in implementations that use IGBT power switches since negative feedback is inherent in IGBT power switches. However, the external current limiting programming resistors on the gates of the IGBTs are necessary to control the rise/fall rates.

The dimmer circuit may include circuitry for ON/OFF and slew rate control. The ON/OFF and slew rate control may be combined into a single functional block, as shown by 108 and 109 of FIG. 1.

Figure 5:
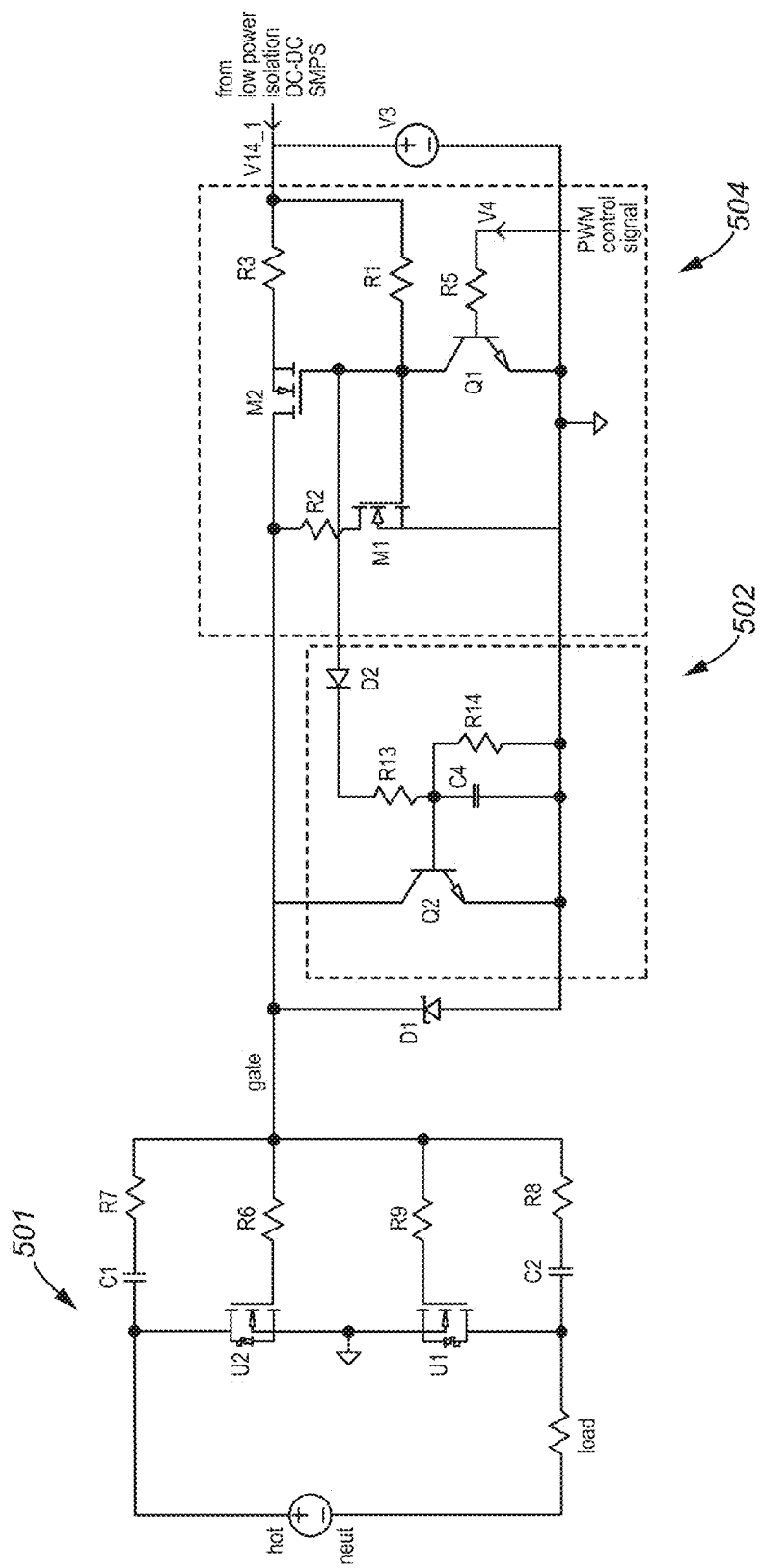
FIG. 5 is a circuit diagram of an exemplary dimmer circuit.

FIG. 5 illustrates an exemplary ON/OFF and slew rate control circuit 504, an exemplary wave shaping circuit 502, and an exemplary dimmer output circuit 501. The ON/OFF and slew rate control circuit 504 may include transistors (Q1, M1, M2), as well as other components. The microcontroller controls the transistors by providing a PWM control signal to the circuit. In one implementation, the PWM control signal is fed to the circuit through an optocoupler or a digital coupler.

The power switching devices, such as the MOSFETs (U1, U2), operate in the linear mode (or resistive or active region) during the transition from the OFF to ON states and the ON to OFF states. The ON/OFF and slew rate control circuit is one option for decreasing the heat dissipation on the power switching devices during the transition from the OFF to ON states and the ON to OFF states. The ON/OFF and slew rate control circuit reduces heat dissipation by reducing the transition time, or slew rate, between the ON/OFF states. For example, the power switching devices dissipate more heat when the transition time is 350 us, than when the transition time is 165 us. Additional options may also be used to dissipate heat, including a heat sink.

Figure 6:
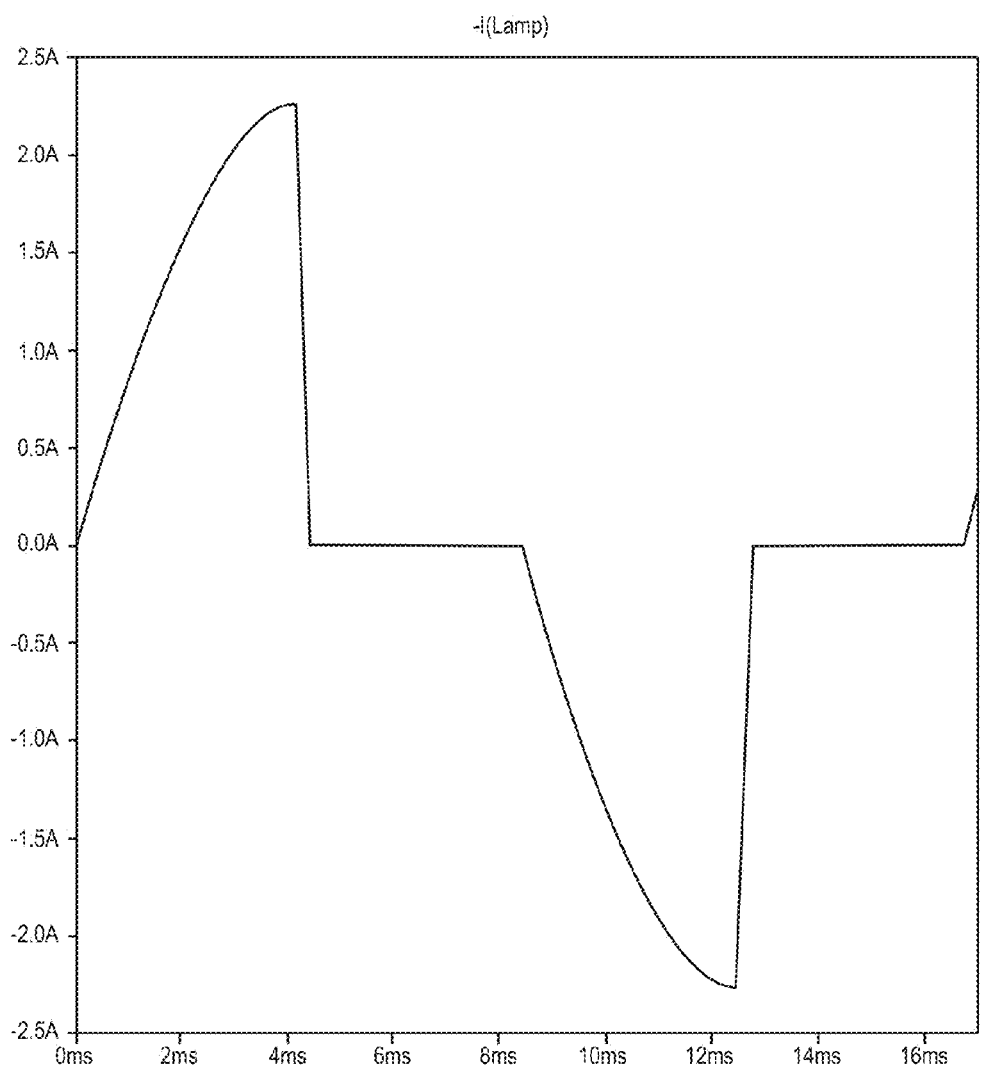
FIG. 6 illustrates reverse phase cut mode dimming for an exemplary dimmer.
Figure 7:
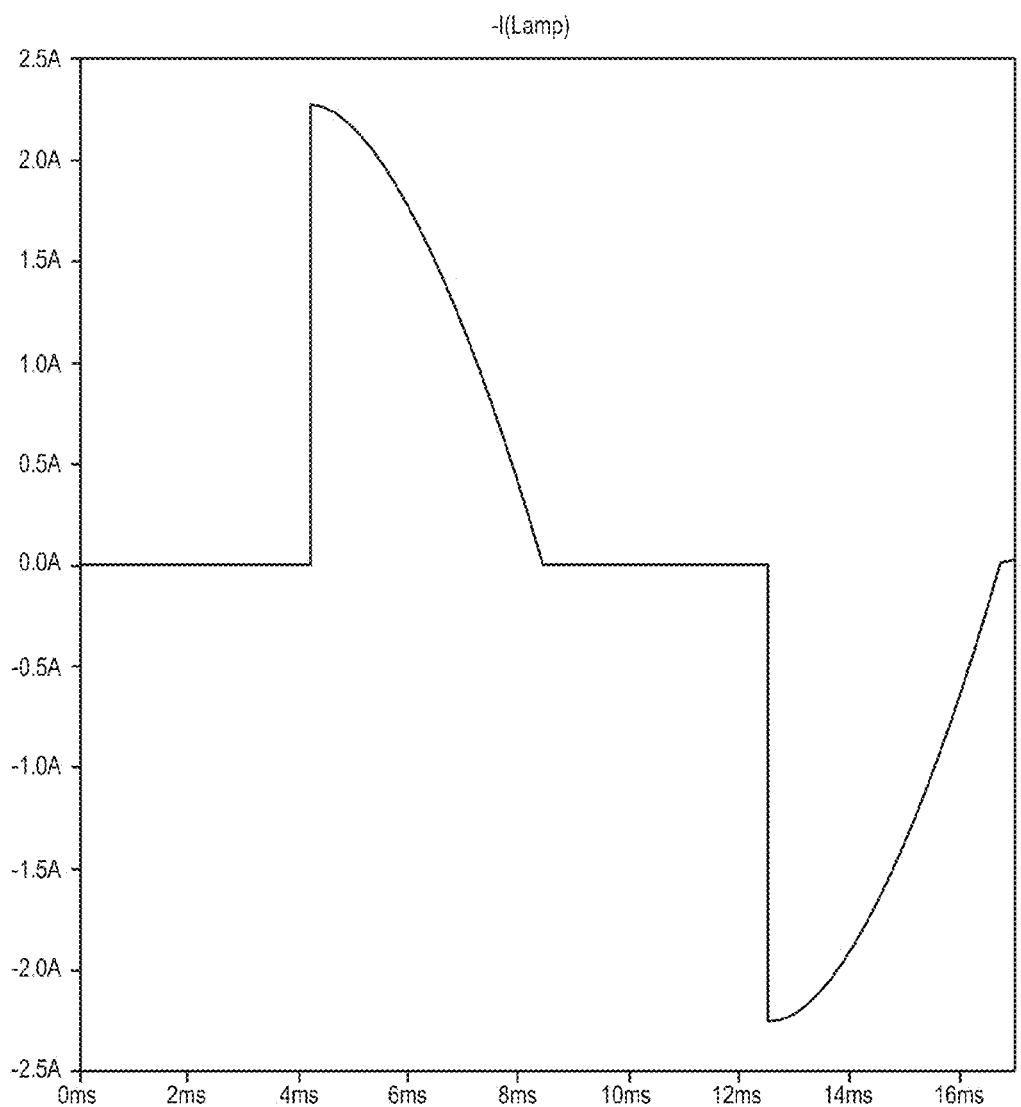
FIG. 7 illustrates forward phase cut mode dimming for an exemplary dimmer.

When the dimmer provides reverse phase cut mode dimming, the ON/OFF and slew rate control circuitry controls the transition time (slew rate) at the falling edge of the phase control signal, as shown in FIG. 6. When the dimmer provides forward phase cut mode dimming, the ON/OFF and slew rate control circuitry controls the transition time (slew rate) at the rising edge of the phase control signal, as shown in FIG. 7. The phase control signal corresponds to the PWM control signal from the microcontroller in that the on time of the waveform corresponds to the pulse width of the PWM control signal.

The wave shaping circuit 502 of FIG. 5 is used in reverse phase cut and hybrid phase cut modes to prevent possible oscillations or stability issues with the power switching devices. The wave shaping circuit provides a hard turn-off after a predetermined time based on the time constant of the circuit. In one implementation, the circuit is tuned so that the predetermined time is 165 us at 50% duty cycle.

During the ON/OFF or OFF/ON transition the power switching devices operate in the active/linear region and dissipate significant amounts of power resulting in higher operating temperatures. Due to the negative temperature coefficients of D2 and Q2 (approximately −2 mV/C) in the wave shaping circuit 502, there is a variable negative time constant that is linearly proportional with the ambient temperature inside the dimmer. As a result, there is nominal turn-off control of the dimmer at 25 C ambient temperature and reduced turn-off control at higher operating temperatures, which provides a first level of thermal protection for the dimmer.

Thermal Protection

Figure 8:
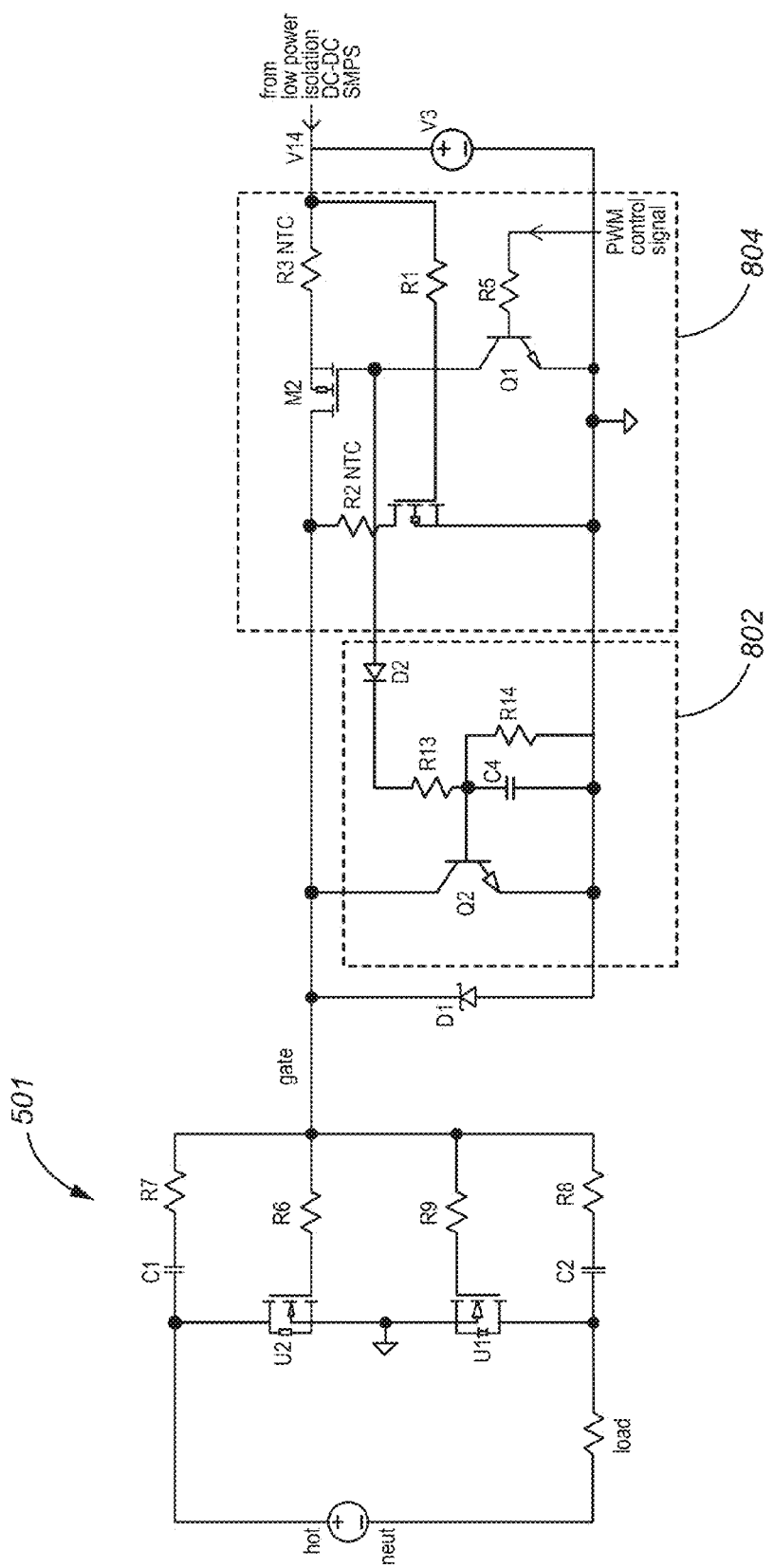
FIG. 8 is a circuit diagram of an exemplary dimmer with temperature-based slew rate control.

The dimmer circuit may monitor temperature and use the temperature to adjust the operation of the dimmer to provide thermal protection other than the nominal turn-off control described in the preceding paragraph. FIG. 8 illustrates one thermal protection option. In FIG. 8 the resistors R2, R3 of FIG. 5 are replaced with thermistors (NTCs) so that the slew rate is adjusted based on ambient temperature. In reverse phase cut mode, the wave shaping circuit 802 automatically reduces transition time (automatic fold-back) with higher ambient temperature so that the dimmer is turned off faster at higher temperatures. This reduces the power dissipation across the dimmer and provides dynamic thermal protection. The actuation time of Q2 is controlled by D2 which is dependent on the ambient temperature. In one embodiment the circuit operates as follows: at 25 C the wave shaping circuit actuates at 165 us, at 50 C it actuates at 125 us, at 75 C at 100 us, etc. When Q2 actuates, the gate voltage is pulled to ground and the power switching devices (U1, U2 in FIG. 8, 110, 111 in FIG. 1) turn OFF and exit the resistive or active or linear mode of operation.

Figure 9:
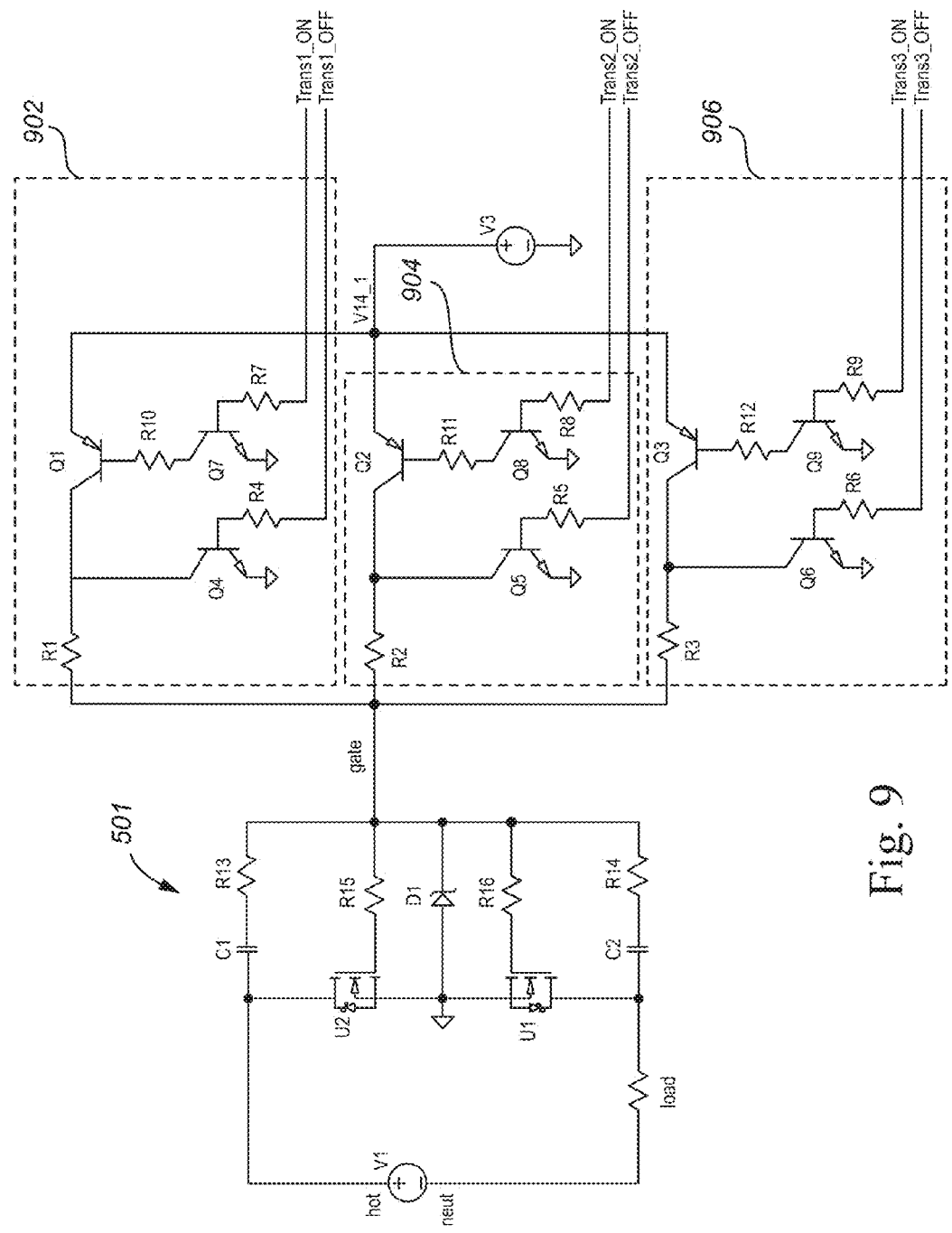
FIG. 9 is a circuit diagram of an exemplary dimmer circuit with multistage transitional control.

FIG. 9 illustrates another alternative to FIG. 5. Instead of the microcontroller controlling the ON/OFF and slew rate circuitry shown in FIG. 5 via the PWM control signal, the microcontroller selects a specific transition circuit 902, 904 or 906 by providing dual PWM control signals to the selected circuit. The different transition circuits provide different transition times. One advantage of the multistage transition control shown in FIG. 9 is that it provides multiple transition time options, instead of a single transition time (e.g., 165 us at 50% duty cycle), as provided by the single stage of FIG. 5. FIG. 9 illustrates three transition circuits, 902, 904, 906. One of the transition circuits 902 provides a long transition time, e.g., 350 us, a second transition circuit 904 provides a medium transition time, e.g., 165 us, and a third transition circuit 906 provides a short transition time, e.g., <10 us. The programming resistors (R1, R2, R3) determine the transition timing for each transition circuit. A larger value will set a longer or slower transition rate, whereas a smaller resistor value will provide a faster or shorter transition rate. The microcontroller selects transition circuit 902 using Trans1_ON and Trans1_OFF, selects transition circuit 904 using Trans2_ON and Trans2_OFF, and selects transition circuit 906 using Trans3_ON and Trans3_OFF. For example, when transition circuit 902 is selected, the on time of the phase control signal is based on the pulse width of the PWM control signal applied to Trans1_ON and the off time of the phase control signal is based on the pulse width of the PWM control signal applied to Trans1_OFF.

In one embodiment, the microcontroller selects the transition time based on temperature, such as the ambient temperature or MOSFET temperature. The microcontroller selects the long transition time circuit 902 when the dimmer is operating at safe/normal temperatures, selects the medium transition time circuit 904 when the dimmer is running hot, and selects the short transition time circuit 906 when the ambient temperature is near the safe operating limits and/or the dimmer is overloaded causing high temperatures on the power switches. The short transition time circuit 906 provides a minimum transition time so that the power switching devices operate in the linear region for a shorter time and thus dissipate less power.

In one implementation the microcontroller compares the temperature to stored values or thresholds. If the temperature is below a first threshold, then the microcontroller selects the long transition time. If the temperature is between the first threshold and a second threshold, then the microcontroller selects the medium transition time and if the temperature is above the second threshold, then it selects the short transition time.

In an alternative implementation, only one transition circuit with an adjustable resistor. In this implementation, the programming resistor (e.g, R1) is replaced by an adjustable resistor and the different values provide different transition times. For example, the adjustable resistor could be a programmable digital potentiometer with for example 64 or 128 taps. Each tap selects a different internal resistor that provides a different transition rates (64/128/256/etc.). Alternatively, this could also be accomplished in the analog domain with J-FET, MOSFET or BJT operating in the active/resistive/linear region to have an infinite number of programmable resistor values. An op amp/comparator circuit configuration may be used for setting the programmable resistor values.

Although not shown in FIG. 9, a wave shaping circuit such as that shown in FIG. 5, may also be included to support reverse phase cut mode or hybrid phase cut mode dimming.

Additional or alternative thermal protection may be provided by the microcontroller 120 by controlling the phase angle or duty cycle of the PWM control signal based on temperature. The microcontroller may obtain temperature information from a temperature sensor 122 of FIG. 1. The temperature sensor may be a thermistor, temperature sensor, diode, an internal temperature sensor on the microcontroller, or any other suitable sensor. In one example, the ADC value of the measured temperature is an input to P/PI/PID (proportional/proportional-integral/proportional-integral-derivative) microcontroller, which may be implemented in firmware on the microcontroller.

If the ambient temperature in the proximity of power switching devices (or direct temperature measurement on the power devices' packaging) exceeds a temperature threshold for the power switching devices and the phase angle exceeds a phase angle threshold, e.g., greater than 55%, then the microcontroller increases the duty cycle of the PWM control signal to decrease the power dissipation on the power switching devices and therefore slow the temperature rise of the die junction inside the silicon power switching devices (MOSFETs/IGBTs/etc). If the temperature is still above the temperature threshold when power switching devices are at 100% duty cycle, then the microcontroller will control the PWM control signal to provide a 0% duty cycle to turn off the dimmer to protect it from an over-temperature condition. If the temperature exceeds the temperature threshold and the phase angle is less than the phase angle threshold, e.g. less than 55%, then the microcontroller decreases the duty cycle of the PWM control signal to decrease the power dissipation on the MOSFETs and therefore lowers the die junction temperature within the Safe Operating Area (SOA as specified in the datasheet from power switching device manufacturer). The P/PI/PID control algorithm stabilizes the dimmer response and eliminates rapid dimming control fluctuations.

Over Current Protection

Figure 10:
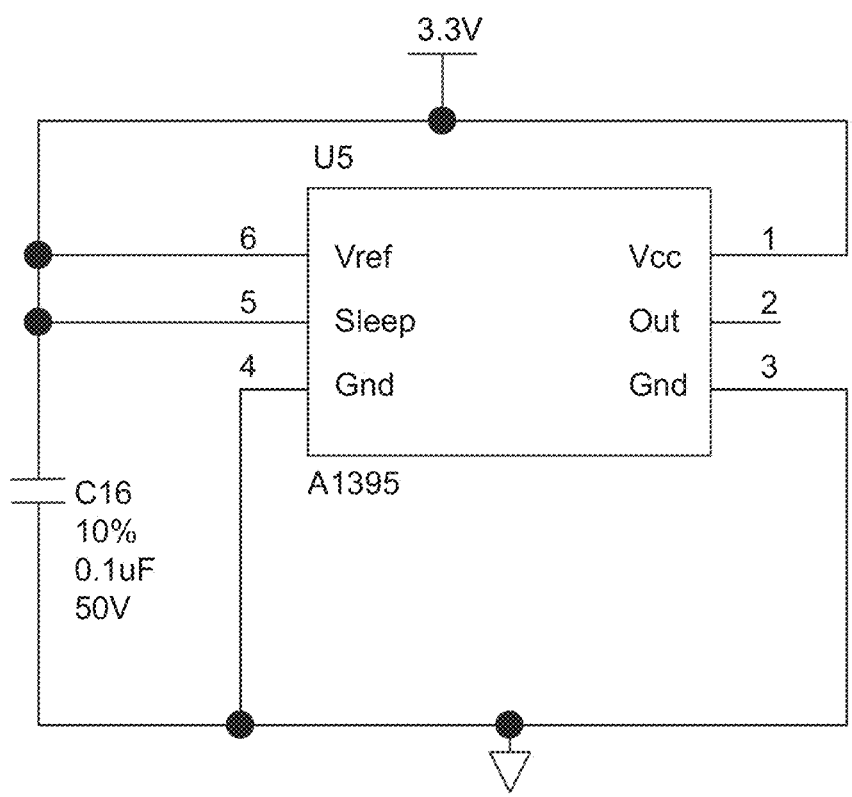
FIG. 10 is a block diagram of an exemplary current sense device.

The dimmer module of FIG. 1 may include current sense devices 106, 107, such as a current sense transformer, Hall affect sensor, current sense resistor, etc. FIG. 10 illustrates an exemplary Hall affect sensor.

The microcontroller receives an output signal from the current sense device via an ADC input, calculates the rms value and measures the peak value, and ensures that the maximum rms and peak ratings of the dimmer are not exceeded. The microcontroller determines if the duty cycle of the PWM control signal needs to be reduced, or if the dimmer needs to be turned off in order to protect the power switching devices from failure.

Another purpose of the current sense device is to detect if any of the power switching devices 110, 111 of FIG. 1 failed open or in a shorted condition. The microcontroller sets the PWM control signal output to maximum if one device fails short. This prevents possible large loading unbalance in a single or three phase system. It also disables dimming, which provides an indication to the user of the failure.

Inductive Load Protection

In one implementation, the default dimmer operating mode is reverse phase cut dimming. This operating mode avoids the inrush current and resulting buzzing noise when incandescent lamps are dimmed with a standard forward phase cut dimmer. One disadvantage of reverse phase cut dimming is that the current through the load is disrupted abruptly. This is not an issue for resistive (current in phase with voltage, e.g., incandescent/tungsten bulbs) and capacitive (current leading voltage) loads. However, for inductive loads (current lagging voltage) this condition could damage the dimmer. Disrupted current flow though the inductive load could create a large flyback voltage and the dimmer circuit will fail if the peak flyback voltage exceeds the maximum voltage withstand rating of the power switching devices.

Figure 11:
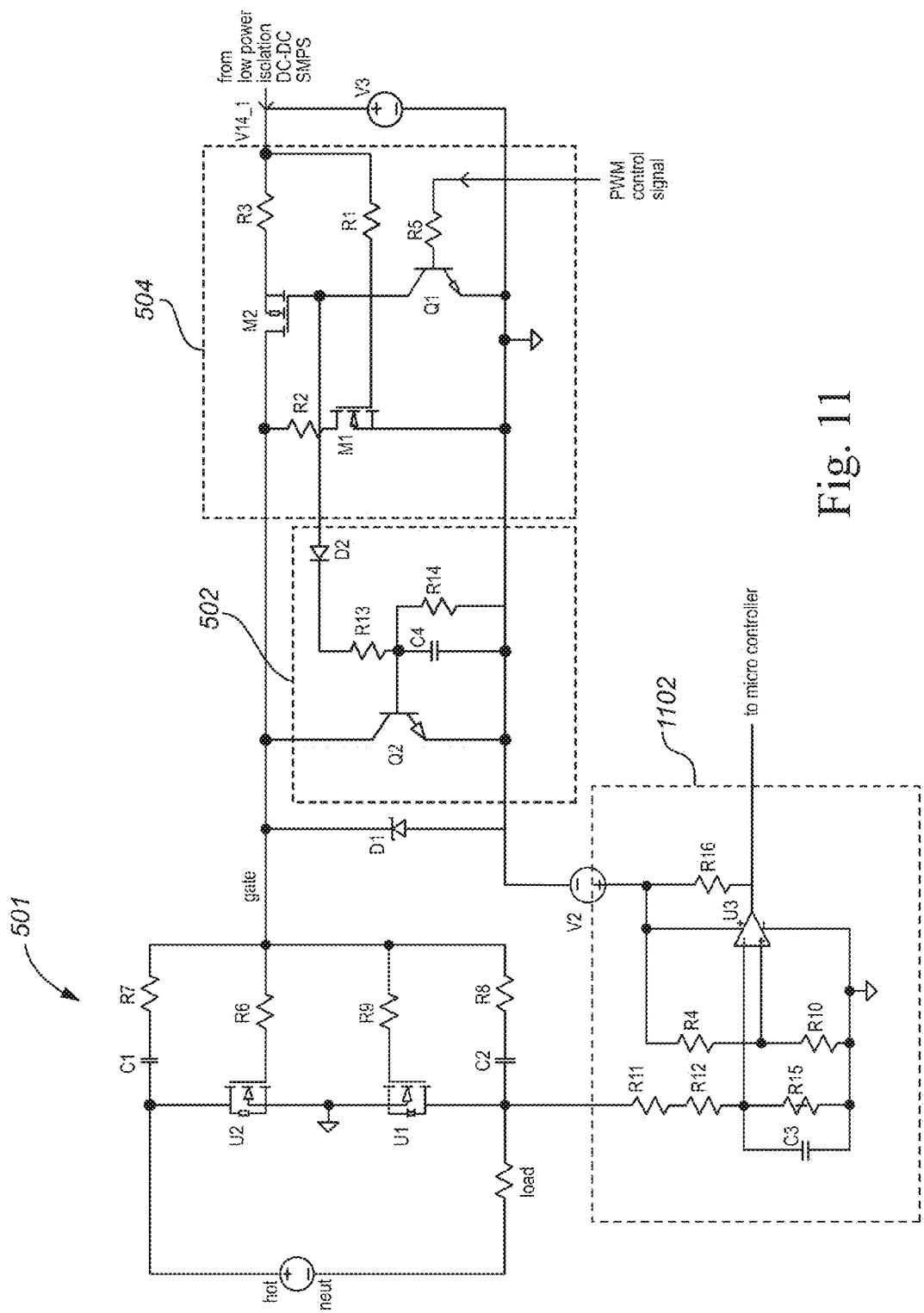
FIG. 11 is a circuit diagram of an exemplary dimmer circuit with inductive load sensing.

The dimmer circuit may also include an inductive sense circuit, as shown in FIG. 1, 112, 113, to detect the flyback voltage. An exemplary inductive sense circuit 1102 is further illustrated by FIG. 11. The circuit includes a comparator, sampling circuit, and reference voltage and generates an output signal that is transmitted through an isolated coupling device to the microcontroller, which notifies the microcontroller that the flyback voltage is present with a peak dangerously close to the maximum voltage rating of the MOSFET. The microcontroller determines whether the phase angle needs to be reduced, or the operating mode needs to change from reverse to forward phase cut mode or hybrid phase cut mode where the dimmer is switched off at the current zero cross point.

Figure 12:
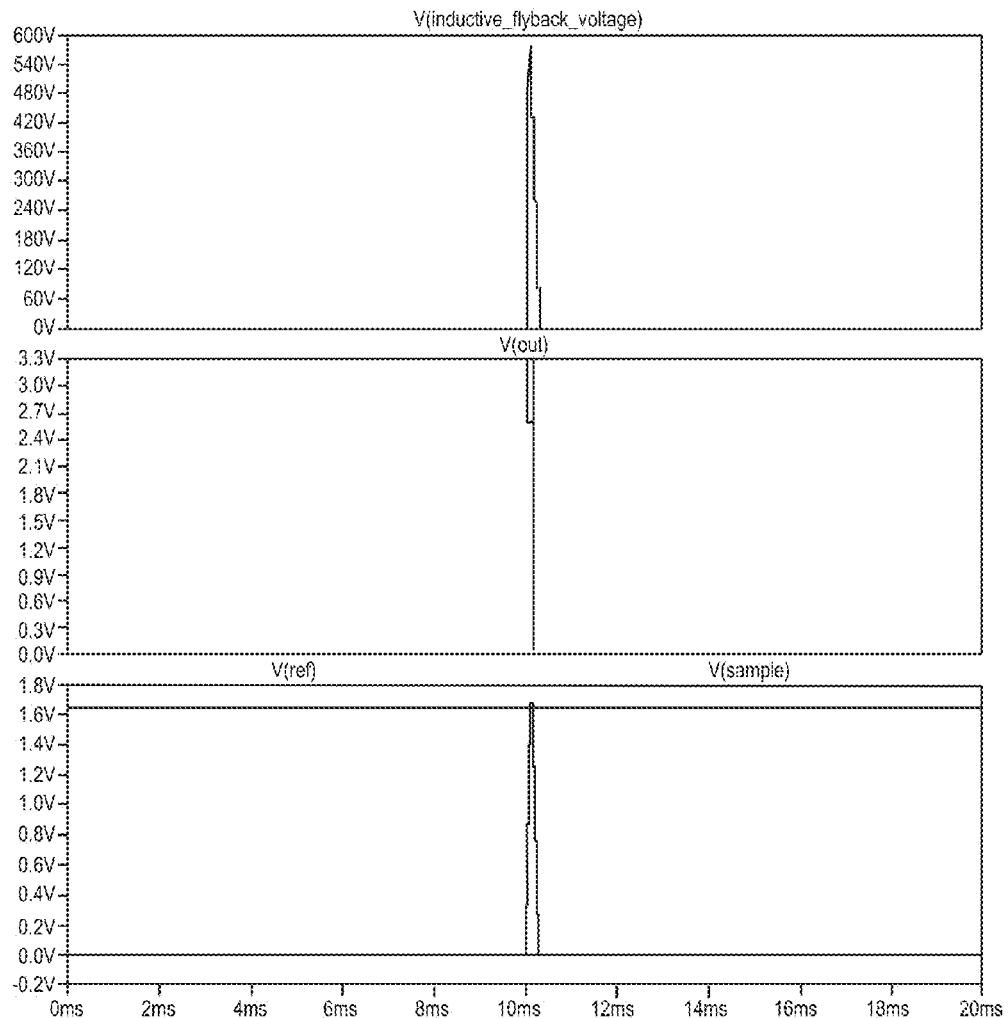
FIG. 12 illustrates an output of the exemplary inductive load sensing circuit of FIG. 11.

In one implementation, when the inductive sense circuit 1101 detects a dangerously large flyback peak voltage, it sends a pulse or flyback voltage warning information to the microcontroller. FIG. 12 shows a typical response of the comparator circuit with flyback voltage from the inductive load that exceeds 570 Vpk. The pulse may be sent through an isolated coupling device, such as an optocoupler or magnetic coupler. Once the microcontroller detects the pulse, it stops increasing the duty cycle of the PWM control signal and waits for multiple periodic pulses (50/60 Hz) to validate the input. If the input is validated, then the microcontroller modifies the PWM control signal to switch from RPC to FPC mode. If the pulses continue while in FPC mode, then the microcontroller switches from FPC to HPC mode. The microcontroller increases the duty cycle in HPC mode until the pulses stop.

Figure 13:
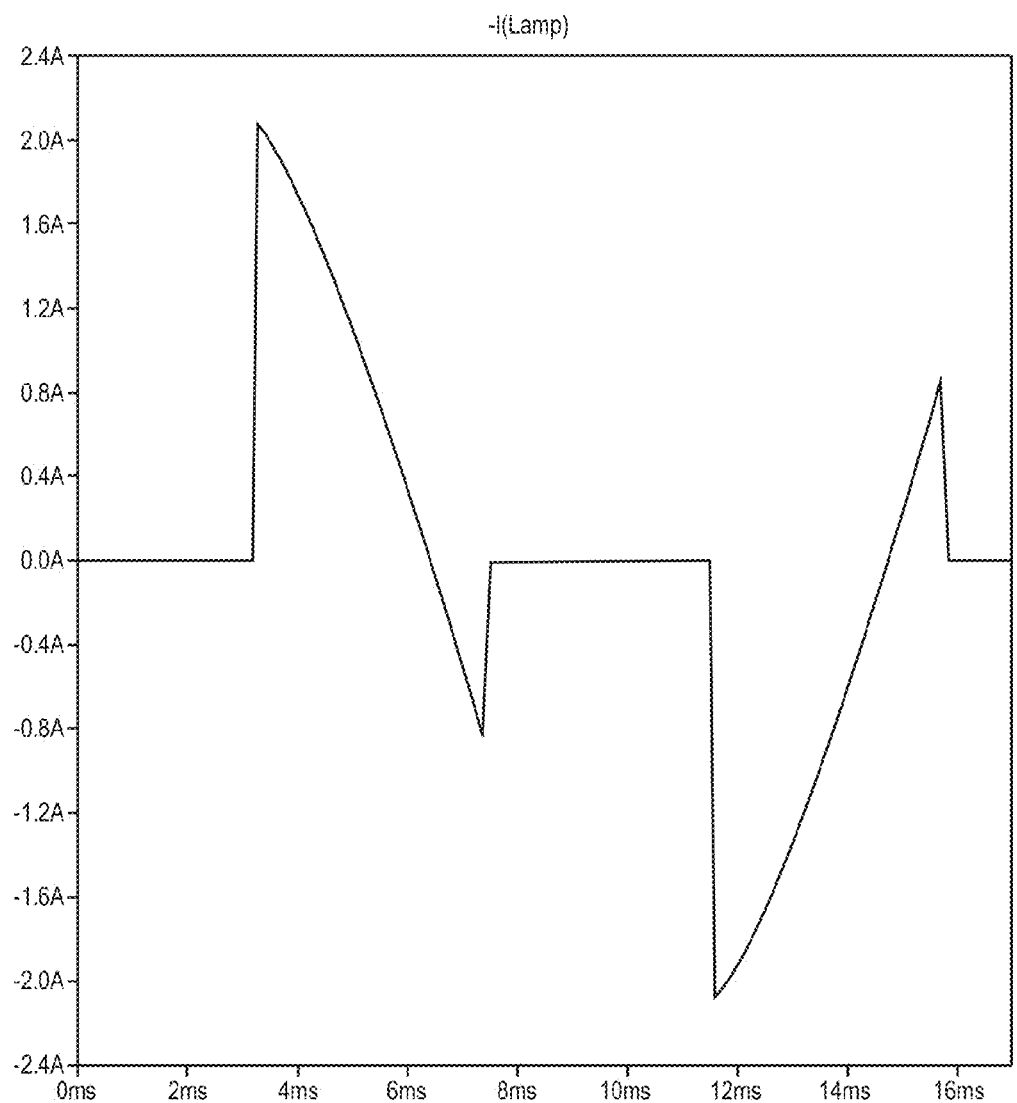
FIG. 13 illustrates hybrid phase cut mode dimming for an exemplary dimmer.

Switching the dimmer off at or near the current zero cross point eliminates the presence of flyback voltage that could damage the dimmer. The current sense circuit (106, 107 of FIG. 1) enables the HPC mode of operation in which the microcontroller turns off the dimmer near the current zero cross point. FIG. 13 illustrates the hybrid mode of operation.

Universal Load Control Module

A dimmer, such as the universal dimmer circuit described above, may be combined with other circuits or functional blocks in a universal load control module, also referred to herein as a load control module. In one implementation, a universal load control module may include multiple universal phase dimmers. In another implementation, a universal load control module may include a universal phase dimmer and a lighting control module that provides ON/OFF switching/relay lighting control. In yet another implementation, a universal load control module may include a universal phase dimmer and a functional control block that provides a control interface such as a 0-10V control interface, or a communication interface such as a DALI, RS422, DMX, DMX/RDM, CAN, USB, I2C, or SPI interface or a wireless interface such as a WIFI (IEEE 802.11), Bluetooth (IEEE 802.15.1), or ZIGBEE (IEEE 802.15.4) interface. Other implementations may include other combinations of functional blocks. The inputs and outputs of the universal load control module depend upon the requirements of the functional control blocks. For example, if a functional control block provides ON/OFF switching load control, then the functional control block may include outputs that control relays, solenoids or SSR (Solid State Relays) to control the load, where the load may include lighting fixtures, fans, HVAC, motors, etc. The relays/solenoids/SSR are turned off when power to the load is are not needed, for example, during the night or weekends when the building or workspace is not occupied.

Figure 14:
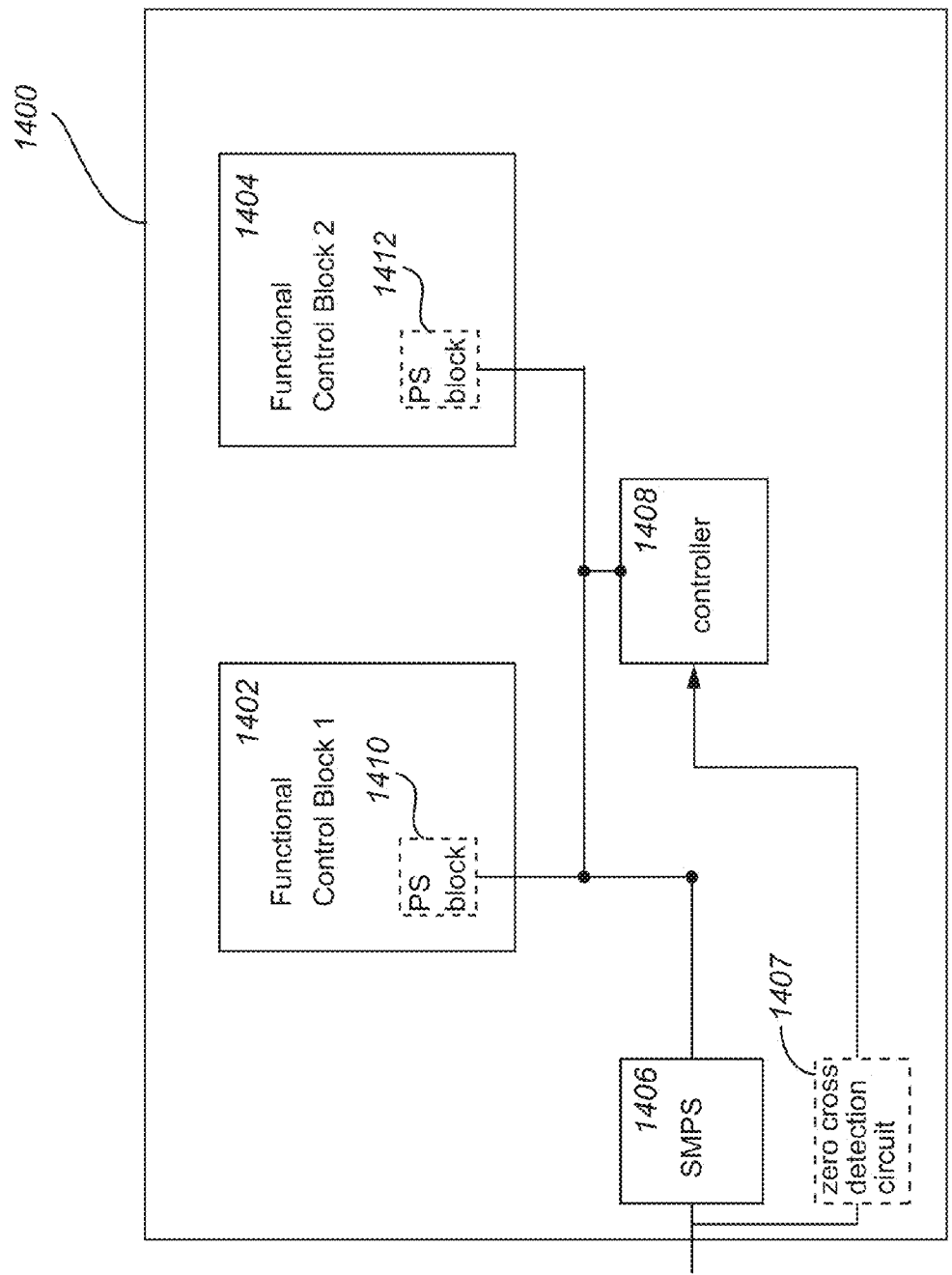
FIG. 14 is a block diagram of an exemplary universal load control module.

The architecture of the universal load control module is illustrated by FIG. 14. The universal load control module 1400 includes a power supply 1406, a microcontroller 1408, and one or more functional control blocks 1402, 1404. Each functional control block may include its own isolated power supply block 1410, 1412 and each functional control block operates independently of any other functional control block in the universal load control module.

The power supply blocks 1410, 1412 may include a low power flyback converter. The flyback converters may be powered from a 24V, 3.3V or any other low voltage output available from the power supply 1406 or directly from the line voltage (120/230/277/347Vac 50/60 Hz). The power supply blocks provide isolation between high voltage and low voltage. The function provided by the power supply blocks is similar to the function provided by the low power isolation DC-DC SMPS block in FIG. 1. Some functional control blocks may not require a power supply block, so the blocks are shown in dashed lines in FIG. 14. For example, if a functional control block includes a communication or control interface, then the power supply block may not be needed. However, it is included whenever there is a need to isolate high and low voltages.

One benefit of the isolated functional control blocks is that a fault or mis-wire on one input/output terminal does not propagate to other functional control blocks within the control module or to the rest of the system. Another advantage of the modular design of the universal load control module is that it allows mixing and matching of functional blocks to support a wide range of applications.

A universal load control module may also include an optional zero cross detection circuit 1407. The zero cross detection circuit may be included when at least one of the functional control blocks includes a phase dimmer or a switching ON/OFF control.

If a universal phase dimmer circuit is included as a functional control block in a universal load control module, then a dimmer circuit similar to that illustrated in FIG. 1 may be included in one of the functional control blocks. Since the universal load control module may include a power supply 1406, a zero cross detection circuit 1407, and a microcontroller 1408, the dimmer circuit can use these components, i.e., the functions for microcontroller 120 described above may be performed by microcontroller 1408, etc.

Another functional control block in the universal load control module may provide a lighting communication interface, such as a DALI interface. A universal load control module configured in this manner may operate independently or may be part of a larger system. If the universal load control module operates independently, it may use its own microcontroller, such as microcontroller 1408, for configuring the dimmer and for providing an external interface or it may rely on an external microcontroller. In the example with a DALI interface, the load control module may interact with a remote DALI controller via its DALI interface.

Other implementations of the universal load control module may not include a phase dimmer or may provide a different type of control or communication interface. For example, a functional control block may provide a communication interface to a cabinet control module or an external controller. If a universal control module only includes control and/or communication interfaces, then it may also be referred to as a universal control module. In addition, the universal load control module is not limited to two functional control blocks. A functional control block may be configured for wired or wireless communication and may support communication standards including, but not limited to ZIGBEE, WIFI, or Bluetooth standards.

Universal Load Control Cabinet

Figure 15:
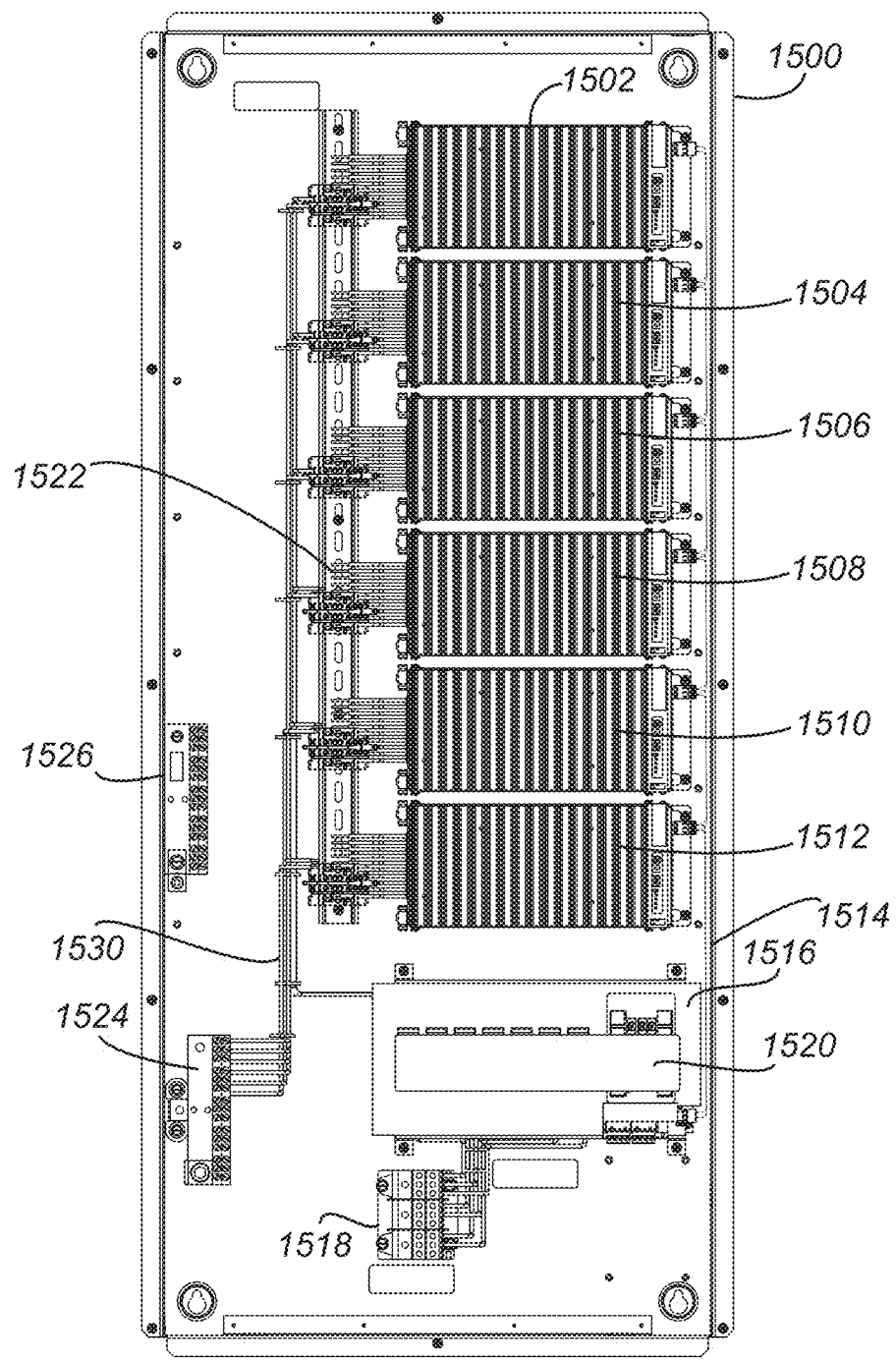
FIG. 15 is a front view of an exemplary load control cabinet without its front panel.

Multiple universal load control modules may be mounted in a single cabinet. FIG. 15 illustrates one implementation of a cabinet 1500 that can accommodate up to six universal load control modules 1502-1512. Each control module is connected to a terminal block, such as terminal block 1522 (for simplicity only one of the six terminal blocks is labeled in FIG. 15). The terminal blocks connect the modules to the power wire harness 1530 that carries a set of conductors that provides power to the modules. The cabinet also includes a ground distribution bar 1526, an optional neutral distribution bar 1524, an optional 3-phase distribution block 1518, branch circuit breakers 1520, a communication wire harness 1514, and a cabinet control module 1516. The communication wire harness 1514 carries a set of conductors that connects the cabinet control module 1516 to the universal load control modules 1502-1512.

Alternative designs of the cabinet may support different numbers of universal load control modules. For example, a small cabinet may support up to 3 universal load control modules, a medium cabinet may support up to 6 modules, and a large cabinet may support up to 9 modules.

Figure 16:
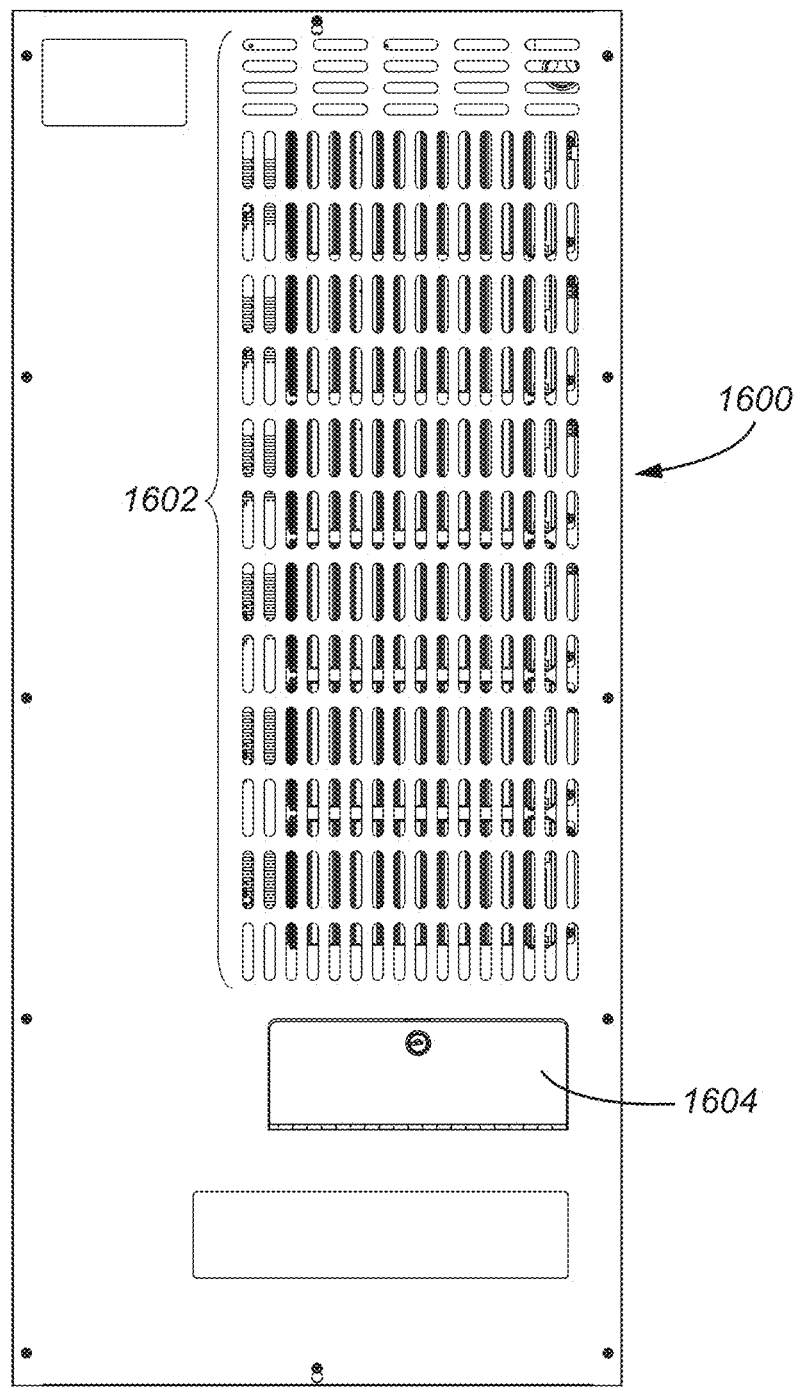
FIG. 16 is a front view of a front panel of an exemplary load control cabinet.

FIG. 16 illustrates the front panel of 1600 of the cabinet and illustrates venting 1602 in the area of the universal load control modules and an access panel 1604 to access the branch circuit breakers 1520 and an optional cabinet control module.

Figure 17:
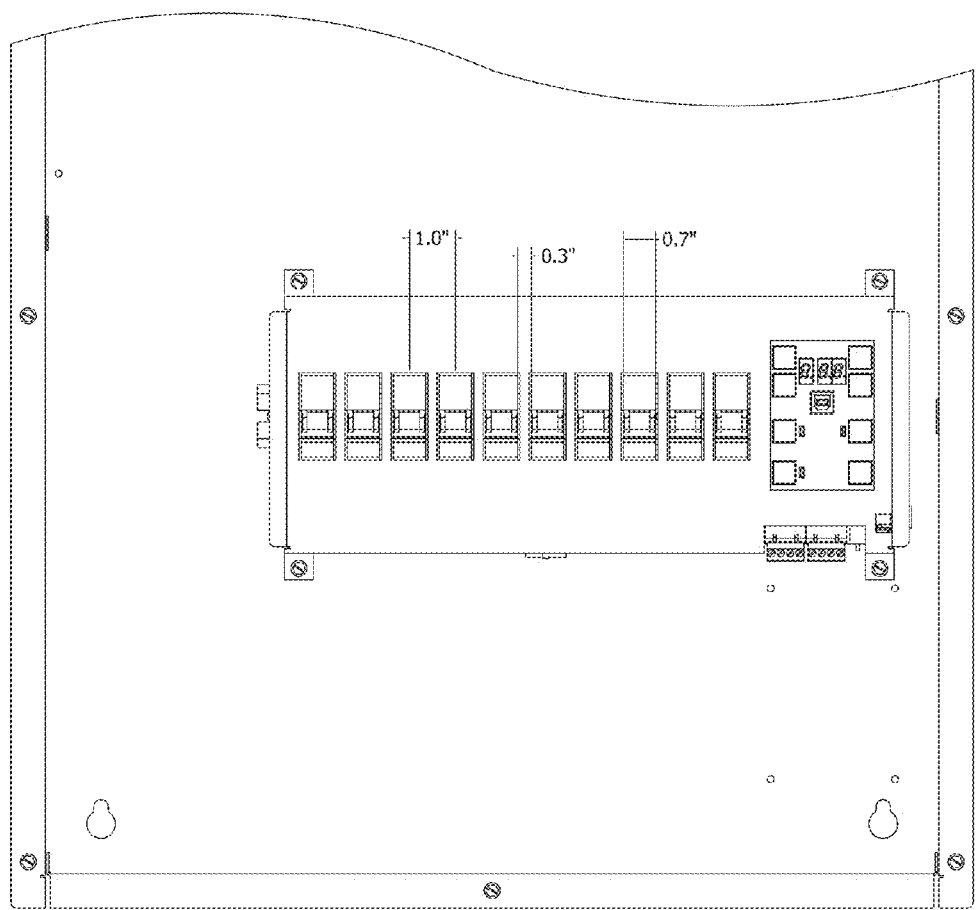
FIG. 17 illustrates the arrangement of branch circuit breakers in an exemplary load control cabinet.

Since multiple universal load control modules may be mounted in the same cabinet, the cabinet may provide multiple branch circuit breakers. In one implementation, the branch circuit breakers are universal input (i.e., multi-volt) thermal magnetic circuit breakers, such as those offered by EATON, part number: FAZ-D20/1-NA-SP. The branch circuit breakers are mounted in the cabinet so that there is an air-gap between the breakers. This spacing allows the breakers to operate over their full input current range without de-rating. FIG. 17 shows an exemplary arrangement of the breakers. As shown in FIG. 15, the breakers may be mounted below the universal load control modules, typically towards the bottom of the panel, so that the performance and ratings of breakers is not affected by the heat generated in the modules. In a feed through implementation, the branch circuit breakers are external to the cabinet.

Figure 18:
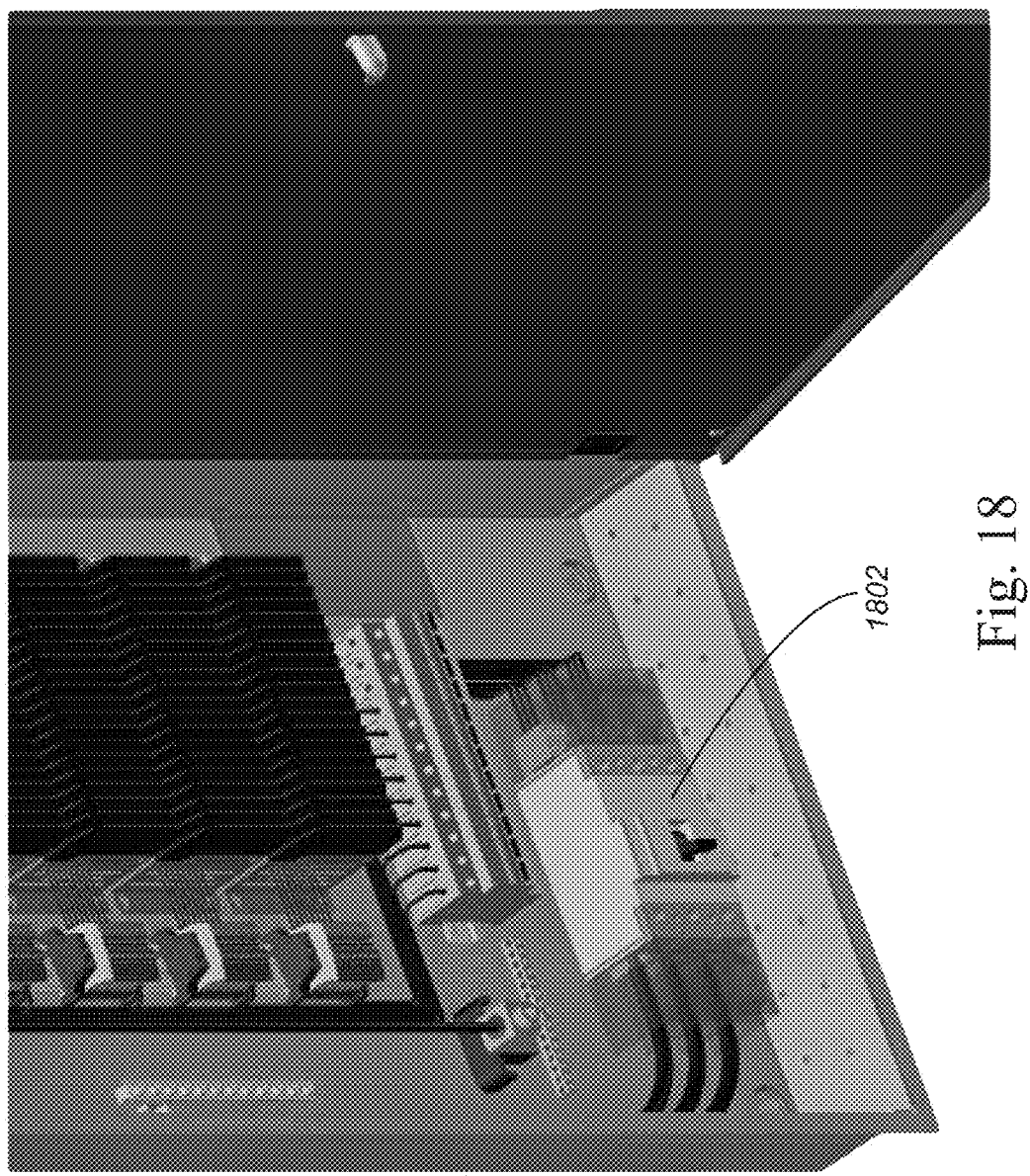
FIG. 18 illustrates the placement of a main circuit breaker in an exemplary load control cabinet.

In addition to the branch circuit breakers, there is a main circuit breaker. The main circuit breaker is a multi-volt breaker and may be located in the cabinet or may be external to the cabinet. FIG. 15 illustrates a cabinet configuration where the main circuit breaker is mounted outside the cabinet and FIG. 18 illustrates a cabinet configuration where the main circuit breaker 1802 is mounted inside the cabinet. If the main circuit breaker is mounted inside the cabinet, then the 3-phase distribution block shown in FIG. 15 is not required. The cabinet may be powered with single, dual or 3 phase (120/230/277/347Vac, 50/60 Hz).

Figure 19:
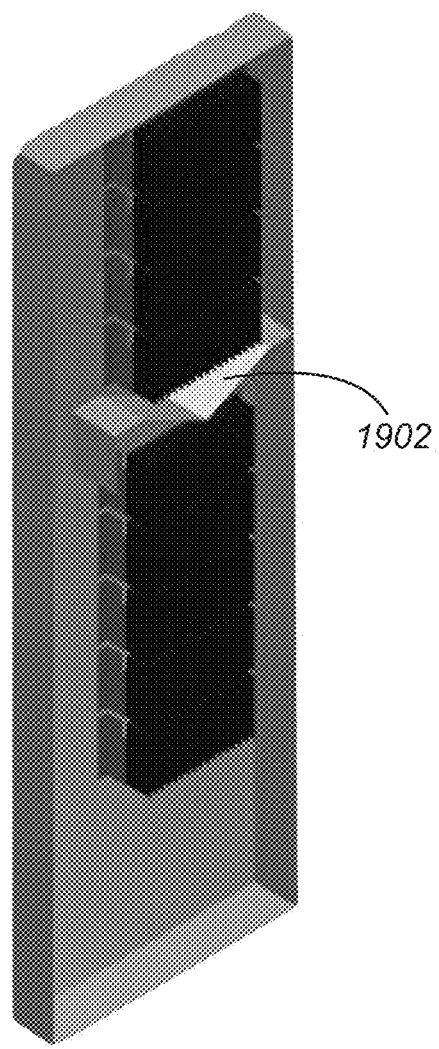
FIG. 19 illustrates a thermal shelf in an exemplary load control cabinet.

The cabinet may include an optional thermal shelf. FIG. 19 illustrates a thermal shelf 1902 located between two adjacent universal load control modules. The thermal shelf disrupts the heat flow from the lower modules to the upper modules and forces the heat to flow away from the modules.

The cabinet may further include an active cooling device, such as a fan or synjet (membrane) device(s). In one implementation, the cooling device is mounted near the top of the cabinet above the universal load control modules.

Universal Cabinet Control Module

The universal cabinet control module communicates with the universal load control modules, including the functional control blocks within the universal load control modules in the cabinet and communicates with external devices or control equipment. In a stand-alone mode, the universal cabinet control module provides a user interface that allows a user to configure and control the universal load control modules in the cabinet. In an external control mode, the universal cabinet control module interfaces with an external controller and a user configures and controls the universal load control modules in the cabinet using a user interface provided by the external controller. Configuration and control of the cabinet includes configuring the operation of the universal load control modules, such as selecting the dimmer curves, setting the rooms and zones, programming the time scheduling, setting the module addresses, etc. The universal cabinet control module may support one or more communication protocols, such as RS485, DMX/RDM, etc.

In one implementation of the stand-alone mode, the user interface includes input devices, such as toggle buttons, and a display, such as a 7-segment display or LCD screen. In one implementation of the external control mode, the universal cabinet control module includes a USB port and an external computing device is connected to the cabinet control module via the USB port.

The universal cabinet control module may include two communication interfaces. The cabinet control module uses one interface to communicate with the universal load control modules in the cabinet and uses the other interface to communicate with external devices, including external controllers and programmable external control equipment. The universal cabinet control module may communicate with a variety of external devices, such as computers, tablets, controllers, mobile phones, etc.

The universal cabinet control module may provide cabinet level thermal protection by monitoring the temperature within the cabinet at one or more locations or receiving temperature information from each of the universal load control modules, and based on the temperature information received, instructing one or more of the universal load control modules to take action, such as adjusting a phase angle or slew rate or turning off a dimmer.

The cabinet control module may collect error or failure information from the individual universal load control modules and report it to a user. Alternatively, if the universal load control module is operating in a stand-alone mode or otherwise configured for communication with a user, the universal load control module may report error or failure information directly to the user.

The foregoing is provided for purposes of illustrating, explaining, and describing aspects of the present invention. Further modifications and adaptations to these examples will be apparent to those skilled in the art and may be made without departing from the scope or spirit of the invention. Different arrangements of the components depicted in the drawings or described above, as well as components not shown or described are possible. For example, the component values, dimensions, and timings provided are exemplary and other values may be used. In addition, loads other than lighting loads may controlled. Similarly, some features and subcombinations are useful and may be employed without reference to other features and subcombinations.

Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the invention.

What is claimed is:

1. A cabinet, comprising:
a main circuit breaker, wherein the main circuit breaker is capable of operating over a wide voltage range;
a plurality of branch circuit breakers, wherein each branch circuit breaker is capable of operating over the wide voltage range and an input of each branch circuit breaker is connected to an output of the main circuit breaker;
a plurality of load control modules, wherein each load control module is connected to an output of at least one of the branch circuit breakers and each load control module includes a power supply capable of operating over the wide voltage range, and wherein each of the load control modules controls at least one lighting load;
a cabinet control module, wherein the cabinet control module configures the load control modules and provides an external communication interface;
a first set of conductors for connecting the load control modules with the outputs of the branch circuit breakers; and
a second set of conductors for connecting the load control modules with the cabinet control module.

2. The cabinet of claim 1, wherein at least one of the load control modules includes a first functional control block that provides lighting control and a second functional control block that provides a communication or control interface.

3. The cabinet of claim 1, wherein at least one of the load control modules includes a first functional control block that includes a dimmer circuit and a first power supply block that provides isolation between a high voltage and a low voltage, a microcontroller, and a zero cross detection circuit.

4. The cabinet of claim 1, further comprising a control module that provides a control or communication interface, wherein the control module includes a power supply that operates over the wide voltage range by detecting an input voltage and adjusting its operation based on the input voltage to provide at least one output voltage to components of the load control module.

5. The cabinet of claim 1, wherein the cabinet includes an access panel to provide access to the branch circuit breakers and the cabinet control module.

6. The cabinet of claim 1, further comprising a display device, wherein the cabinet control module interfaces with the display device.

7. The cabinet of claim 1, further comprising an input device, wherein the cabinet control module interfaces with the input device.

8. A cabinet, comprising:
a plurality of branch circuit breakers, wherein each branch circuit breaker is capable of operating over a wide voltage range;
a plurality of load control modules, wherein each load control module is connected to an output of at least one of the branch circuit breakers and each load control module includes a power supply capable of operating over the wide voltage range and wherein each of the load control modules controls at least one lighting load;
a cabinet control module, wherein the cabinet control module configures the load control modules and provides an external communication interface;
a first set of conductors for connecting the control modules with the outputs of the branch circuit breakers; and
a second set of conductors for connecting the control modules with the cabinet control module.

9. The cabinet of claim 8, further comprising a plurality of terminal blocks, wherein one of the terminal blocks connects one of the load control modules to one of the conductors of the first set of conductors.

10. The cabinet of claim 8, wherein the cabinet includes an access panel that allows access to the branch circuit breakers and the cabinet control module.

11. The cabinet of claim 8, further comprising a distribution block, wherein the distribution block is connected to a main circuit breaker that is external to the cabinet and to the branch circuit breakers.

12. The cabinet of claim 8, wherein at least one of the load control modules includes a first functional control block that includes a dimmer circuit and a first power supply block that provides isolation between a high voltage and a low voltage, a microcontroller, and a zero cross detection circuit.

13. The cabinet of claim 8, further comprising a display device, wherein the cabinet control module interfaces with the display device.

14. The cabinet of claim 8, further comprising an input device, wherein the cabinet control module interfaces with the input device.

15. A cabinet, comprising:
a plurality of load control modules, wherein each load control module includes a power supply capable of automatically detecting an input voltage and adjusting operations to operate over a wide voltage range and wherein each of the load control modules controls at least one lighting load;
a cabinet control module, wherein the cabinet control module configures the load control modules and provides an external communication interface;
a first set of conductors for providing power to the control modules; and
a second set of conductors for connecting the control modules with the cabinet control module.

16. The cabinet of claim 15, wherein the first set of conductors are connected to a plurality of branch circuit breakers located external to the cabinet.

17. The cabinet of claim 15, further comprising a plurality of branch circuit breakers, wherein each branch circuit breaker is capable of operating over the wide voltage range and each load control module is connected to an output of at least one of the branch circuit breakers.

18. The cabinet of claim 17, wherein an input of each branch circuit breaker is connected to an output of a main circuit breaker, wherein the main circuit breaker is located in the cabinet or external to the cabinet.

19. The cabinet of claim 15, further comprising a display device, wherein the cabinet control module interfaces with the display device.

20. The cabinet of claim 15, further comprising an input device, wherein the cabinet control module interfaces with the input device.

* * * * *